(12) United States Patent
Lv et al.

(10) Patent No.: US 9,158,409 B2
(45) Date of Patent: Oct. 13, 2015

(54) OBJECT DETERMINING METHOD, OBJECT DISPLAY METHOD, OBJECT SWITCHING METHOD AND ELECTRONIC DEVICE

(75) Inventors: Lei Lv, Beijing (CN); Ming Cai, Beijing (CN); Yuan Yao, Beijing (CN)

(73) Assignees: BEIJING LENOVO SOFTWARE LTD, Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 236 days.

(21) Appl. No.: 13/142,374

(22) PCT Filed: Sep. 27, 2010

(86) PCT No.: PCT/CN2010/077379
§ 371 (c)(1),
(2), (4) Date: Jun. 27, 2011

(87) PCT Pub. No.: WO2011/038669
PCT Pub. Date: Apr. 7, 2011

(65) Prior Publication Data
US 2012/0218196 A1 Aug. 30, 2012

(30) Foreign Application Priority Data

Sep. 29, 2009 (CN) .......................... 2009 1 0235572
Apr. 16, 2010 (CN) .......................... 2010 1 0153030

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/0488* (2013.01); *H04M 1/72583* (2013.01);
(Continued)

(58) Field of Classification Search
CPC combination set(s) only.
See application file for complete search history.

(56) References Cited

U.S. PATENT DOCUMENTS 5,876,178 A * 3/1999 Heitl .............................. 414/726
7,487,210 B2 * 2/2009 Ludwig et al. ................ 709/204
(Continued)

FOREIGN PATENT DOCUMENTS

CN 1567140 A 1/2005
CN 1728068 A 1/2006
(Continued)

OTHER PUBLICATIONS 201010153030.8 Chinese Office Action dated Jun. 5, 2012 (9 pages).
(Continued)

*Primary Examiner* — Linh N Hoffner
(74) *Attorney, Agent, or Firm* — Brinks Gilson & Lione; G. Peter Nichols

(57) ABSTRACT

The embodiments of the invention disclose an object determining method, a portable device, an object displaying method, an object switching method and an electronic device. Said method is applied to a touch sensitive portable device. Identifications of multiple objects are displayed within a display area of said portable device. Each of the identifications of said multiple objects has a first status of being selected and a second status of being unselected. Said display area has a first area, the identification of a first object is displayed in the first area, and the first object is in the first status. Said method comprises: obtaining a switch instruction; moving the identification of the first object out of the first area, switching the identification of the first object from the first status to the second status, moving the identification of the second object into the first area, and switching the identification of the second object from the second status to the first status according to the switch instruction. The embodiments of the invention can simplify the steps of the user's operation.

16 Claims, 10 Drawing Sheets

(1)

(2)

(51) Int. Cl.
*H04M 1/725* (2006.01)
*G06F 3/0481* (2013.01)
*G06F 3/0486* (2013.01)
*G06F 3/0484* (2013.01)

(52) U.S. Cl.
CPC ........... *G06F3/0486* (2013.01); *G06F 3/04817* (2013.01); *G06F 3/04842* (2013.01); *H04M 2250/22* (2013.01)

(56) References Cited

U.S. PATENT DOCUMENTS

| | | | |
|---|---|---|---|
| 7,495,659 B2 * | 2/2009 | Marriott et al. | 345/173 |
| 7,506,275 B2 * | 3/2009 | Conradt et al. | 715/857 |
| 8,223,127 B2 * | 7/2012 | Park et al. | 345/169 |
| 8,571,521 B2 * | 10/2013 | Kim et al. | 455/411 |
| 2006/0022961 A1 | 2/2006 | Kaminaga | |
| 2007/0273669 A1 * | 11/2007 | Park et al. | 345/173 |
| 2008/0122796 A1 * | 5/2008 | Jobs et al. | 345/173 |
| 2008/0129757 A1 * | 6/2008 | Tanaka et al. | 345/660 |
| 2008/0259045 A1 * | 10/2008 | Kim et al. | 345/173 |
| 2009/0058821 A1 * | 3/2009 | Chaudhri et al. | 345/173 |
| 2010/0122195 A1 * | 5/2010 | Hwang | 715/769 |
| 2010/0269040 A1 * | 10/2010 | Lee | 715/702 |

FOREIGN PATENT DOCUMENTS

| | | |
|---|---|---|
| CN | 1728068 A | 2/2006 |
| CN | 1910577 A | 2/2007 |
| CN | 101030117 A | 9/2007 |

OTHER PUBLICATIONS

International Preliminary Report on Patentability for PCT Patent Application Serial No. PCT/CN2010/077379, dated Apr. 3, 2012, 5 pages.
PCT/CN2010/077379 International Search Report dated Jan. 6, 2011 (6 pages including English translation).

* cited by examiner

OBJECT DETERMINING METHOD, OBJECT DISPLAY METHOD, OBJECT SWITCHING METHOD AND ELECTRONIC DEVICE

FIELD OF THE INVENTION

The present invention relates to the field of electronic device, and particularly relates to an object determining method, a portable device, an object displaying method, an object switching method and an electronic device.

BACKGROUND OF THE INVENTION

As is well known, the ways in which a user communicates with contacts using mobile terminals include: phone calls, sending short messages, logging on an instant messaging software and sending E-mails. The existing electronic device with touch function comprises a cell phone with touch function. When a user operates on multiple objects under a same display page, since there's no selecting function, the user often needs to find a determined object from multiple objects, then enter the page of this object by clicking this object, and finally click the operation items within this page, thereby completing a series of specific operations to this object.

Taking phone calls for example, when a user calls a contact using a mobile terminal, he usually needs to operate in the following manners:

Manner 1: selecting the directory, finding a contact desired to contact in the directory by operations, clicking the contact to enter the page of the contact, and then clicking the mobile phone number of the contact to complete the call to the contact;

Manner 2: selecting the directory, finding a contact desired to contact in the directory by operations, clicking the contact, popping up a menu, and then clicking "call" item in the menu to complete the call to the contact.

From the above two manners, it can be seen that, the user's operations are complicated, cumbersome, and it is not convenient to the user.

Also, in the electronic device such as computer and mobile terminal, usually, a plurality of objects are stored in certain order, and the objects are for example pictures, audio files, contact information or the like. When the user wants to switch the currently displayed object, a switch instruction is issued. The switch instruction may be a key-triggered instruction. Alternatively, in the case that the electronic device has a touch screen, the switch instruction may be a touch action, such as a slide action. Usually, there are two switching modes to perform switching in response to the switch instruction.

In the first switching mode, the electronic device switches the currently displayed object to the adjacent next object or previous object. However, in the case that the number of objects is large, if the user wants to switch to the object which is far away from the currently displayed object, multiple switch instructions need to be issued, resulting in low efficiency, and is not convenient to the user.

In the second switching mode, the electronic device performs switching for example in accordance with the speed of the slide action or the duration of pressing a key. If the slide speed is fast or the duration of pressing a key is long, the electronic device switches the display to an object which is far away from the currently displayed object, and if the slide speed is slow or the duration of pressing a key is short, the electronic device switches the display to an object which is near the currently displayed object. However, since this switching mode depends on the user's touch action or the duration of pressing a key, the demand for user's operation ability is high. In some cases, the user desires to switch the display only to the adjacent previous object or next object, however, since the user does not know the judging criterion of the speed of a slide action or the duration of pressing a key of the electronic device, the slide speed may be too fast or the duration of pressing a key may be too long, thereby the electronic device switches the display to an object which is not adjacent and is relatively far away from the currently displayed object, resulting in more error operations, and is not convenient to the user.

SUMMARY OF THE INVENTION

The embodiments of the invention provide a method and a device for determining object, which can simplify steps of the user's operation.

An object determining method, applied to a touch sensitive portable device, identifications of multiple objects are displayed within a display area of said portable device, each of the identifications of said multiple objects has a first status of selected and a second status of unselected, wherein said display area has a first area, the identification of a first object is displayed in the first area, the first object is in the first status, said method includes:

obtaining a switch instruction;

moving the identification of the first object out of the first area, switching the identification of the first object from the first status to the second status, moving the identification of the second object into the first area, and switching the identification of the second object from the second status to the first status according to the switch instruction.

Preferably, said obtaining a switch instruction includes:

detecting a first slide gesture in the first area, and does not responding to the original touch point of the first slide gesture;

determining a first direction of the first slide gesture;

according to the first slide gesture and the first direction, determining the switch instruction.

Optionally, by clicking the identification of the second object within the first area, a page of contact information of the second object is open.

Optionally, said method further includes:

obtaining an operation instruction;

according to the operation instruction, starting an application;

the application invoking a first information of the second object within the first area.

Preferably, said "obtaining an operation instruction" particularly refers to:

detecting an operation gesture within the second area of the display area of the portable device, wherein an identification of an application is displayed in the second area;

said "according to the operation instruction, starting an application" particularly refers to:

according to the operation gesture, starting application displayed within the second area.

Preferably, said "obtaining an operation instruction" particularly refers to:

detecting a second slide gesture and not responding to the original touch point of the second slide gesture, and the original touch point is located within the first area, the display area of the portable device also has the second area, an identification of an application is displayed in the second area;

determining a second direction of the second slide gesture, wherein the second direction points to the second area;

according to the second slide gesture and the second direction, determining the operation instruction.

Preferably, the application includes a call program, a short message program, a chat program, an e-mail program.

Preferably, the method also includes performing switch to the display of K objects $[D_1, \ldots, D_K]$, wherein performing switch to displays of K objects $[D_1, \ldots, D_K]$ includes:

obtaining a second switch instruction;

switching from the first mode to the second mode, or from the second mode to the first mode according to the second switch instruction;

wherein, in the first mode, when a first input instruction is obtained, according to an input parameter information of the first input instruction, in the case that the first object is $D_j$, the second object is $D_{j-1}$ or $D_{j+1}$, in the second mode, when a second input instruction is obtained, according to an input parameter information of the second input instruction, in the case that the first object is $D_j$, the second object is $D_{j-N}$ or $D_{j+N}$, said K, j, N are integers, and K≥1, N≥1, 1≤j≤K.

Preferably, the method further includes displaying K objects, displaying K objects includes:

obtaining a second switch instruction; and switching from the first display mode to the second display mode, or from the second display mode to the first display mode according to the second switch instruction;

wherein, in the first display mode, m objects among the K objects are displayed;

in the second display mode, n objects among the K objects are displayed;

said K, m, n are integers, and 1≤m<n≤K.

Preferably, said objects are contacts in the directory.

An portable device having a touch sensitive function, identifications of multiple objects are displayed within a display area of said portable device, each of the identifications of said multiple objects has a first status of selected and a second status of unselected, wherein said display area has a first area, an identification of a first object is displayed in the first area, the first object is in the first status, said portable device includes:

a first obtaining unit, for obtaining a switch instruction;

a switching unit, for moving the identification of the first object out of the first area, identification switching the first object from the first status to the second status, moving the identification of the second object into the first area, and switching the identification of the second object from the second status to the first status, according to the switch instruction.

Preferably, said first obtaining unit includes:

a first detecting unit, for detecting a first slide gesture in the first area, and does not responding to the original touch point of the first slide gesture;

a first determining unit, for determining a first direction of the first slide gesture;

a second determining unit, for determining the switch instruction according to the first slide gesture and the first direction.

Optionally, by clicking the identification of the second object within the first area, a page of contact information of the second object is open.

Optionally, said portable device further includes:

a second obtaining unit, for obtaining an operation instruction;

a starting unit, for starting an application according to the operation instruction, the application invoking a first information of the second object within the first area.

Preferably, said second obtaining unit includes:

a second detecting unit, for detecting an operation gesture within the second area of the display area of the portable device, wherein an identification of an application is displayed in the second area;

said starting unit includes:

a sub starting unit, for starting the application displayed within the second area according to the operation gesture.

Preferably, said second obtaining unit includes:

a third detecting unit, for detecting a second slide gesture, and does not responding to the original touch point of the second slide gesture, and the original touch point is located within the first area, the display area of the portable device also has the second area, an identification of an application is displayed in the second area;

a third determining unit, for determining a second direction of the second slide gesture, wherein the second direction points to the second area;

a fourth determining unit, for determining an operation instruction according to the second slide gesture and the second direction.

Preferably, the portable device includes a mobile terminal or a notebook computer.

Preferably, the application includes a call program, a short message program, a chat program and an e-mail program.

Preferably, the portable device also includes means for performing switch to displays of K objects $[D_1, \ldots, D_K]$, wherein means for performing switch to displays of K objects $[D_1, \ldots, D_K]$ includes:

a third obtaining unit, for obtaining a second switch instruction;

a mode switching unit, for switching from the first mode to the second mode or from the second mode to the first mode according to the second switch instruction;

wherein, in the first mode, when a first input instruction is obtained, according to an input parameter information of the first input instruction, in the case that the first object is $D_j$, the second object is $D_{j-1}$ or $D_{j+1}$, in the second mode, when a second input instruction is obtained, according to an input parameter information of the second input instruction, in the case that the first object is $D_j$, the second object is $D_{j-N}$ or $D_{j+N}$, said K, j, N are integers, and K≥1, N≥1, 1≤j≤K.

Preferably, the portable device further includes means for displaying K objects, the means for displaying K objects includes:

a third obtaining unit, for obtaining a second switch instruction; and a mode switching unit, for switching from the first mode to the second mode or from the second mode to the first mode according to the second switch instruction;

wherein, in the first mode, m objects among the K objects are displayed, in the second mode, n objects among the K objects are displayed, said K, m, n are integers, and 1≤m<n≤K.

It can been that, in the embodiment of the invention, when a switch instruction is obtained, the identification of the first object can be moved out of the first area, and the identification of the second object will be moved into the first area. When the first object comes into the first area, unselected status is switched to selected status. Then at this time, when the user starts an first application by clicking the identification of the first application, the application can find an object which is in a selected status. In addition, the user can further perform switch and display to multiple objects stored in the electronic device in different modes, as necessary, thereby realizing enhancing of efficiency of viewing and decrease of error operations, further improving user experience. Also, the user can set an object in the center of screen by clicking the object, and an identification of an application can appear around the object, clicking the identification of the application can invoke the application which uses information of object, thereby making user's operation more convenient.

In the prior art, taking making a call using a mobile phone with touch function as an example, when the user calls a contact person named Zhang San, he should find Zhang San in the name list of the directory. Since not only Zhang San's name, but also Li Si and other contacts' names are in the name list of the directory at this time, the user presses "call" button at this time, and cannot establish a communication connection with Zhang San. The reason is that the existing mobile phone with touch function does not have selecting function when multiple objects are displayed in a same display page. Therefore, after the user presses "call" button, and starts call program, the call program does not know whether the person the user desire to contact with is Zhang San or Li Si.

With the technical solution provided by the embodiment of the invention, when the user triggers a switch instruction by an operation, contacts in the directory are switched. When the contact Zhang San is in the first area, the contact Zhang San is in a selected status. When the user presses "call" button, the call program can quickly invoke information related to the contact Zhang San which is in the selected status, thereby establishing the communication connection with Zhang San, simplifying user's operation, and bringing better use experience to the user. Also, the user can perform switch to display multiple objects stored in the electronic device, such as Zhang San, Li Si, Wang Wu, and the like, in different mode with simple operations, as necessary, thereby realizing improvement of view efficiency and decrease of error operation, and improving user experience.

In addition, the invention also provides an object displaying method, an object switching method and an electronic device, which enables the user to switch to display on multiple objects stored in the electronic device in different modes with simple operation as necessary, thereby realizing improvement of view efficiency and decrease of error operation, and improving user experience.

According to one aspect of the invention, an object switching method, for performing switch on K objects $[D_1, \ldots, D_K]$ stored in a storage medium of a electronic device, said method includes: obtaining a switch instruction; switching from a first mode to a second mode, or from the second mode to the first mode according to the switch instruction; wherein, in the first mode, when a first input instruction is obtained, according to input parameter information of the first input instruction, switching each object $D_j$ currently displayed to $D_{j-1}$ or $D_{j+1}$; in the second mode, when a second input instruction is obtained, according to input parameter information of the second input instruction, switching each object $D_j$ currently displayed to $D_{j-N}$ or $D_{j+N}$, said K, j, N are integers, and K≥1, N≥1, 1≤j≤K.

Preferably, the electronic device includes a touch screen, and issues the switch instruction, the first input instruction and the second input instruction by touching the touch screen.

Preferably, the input parameter information of the first input instruction includes the direction of a touch action, the input parameter information of the second input instruction includes at least one of the strength, the length and the speed, and the direction of the touch action.

Preferably, in the case that the current mode is the first mode, detecting duration of touching a first predetermined area on the touch screen. If the duration exceeds a predetermined period, the electronic device switches to the second mode.

Optionally, in the case that the current mode is the second mode, detecting duration of touching a first predetermined area on the touch screen. If the duration exceeds a predetermined period, the electronic device switches to the first mode.

Preferably, in the case that the current mode is the second mode, if touching a second predetermined area on the touch screen is detected, the electronic device switches to the first mode.

Optionally, in the case that the current mode is the first mode, if touching a second predetermined area on the touch screen is detected, the electronic device switches to the second mode.

Preferably, by selecting one of the objects displayed on the touch screen, the object will appear in a first determined area on the touch screen.

Preferably, by clicking the identification of the object within the first predetermined area, a page of contact information of the object is open.

Preferably, the object switching method further includes:
obtaining an operation instruction;
starting an application according to the operation instruction;
the application invoking a first information of the object within the first predetermined area.

Preferably, said "obtaining an operation instruction" particularly refers to:
detecting an operation gesture within a second predetermined area on the touch screen, wherein an identification of an application is displayed within the second predetermined area;
said "starting an application according to the operation instruction" particularly refers to:
starting the application displayed within the second predetermined area according to the operation gesture.

According to another aspect of the invention, an object displaying method, for displaying K objects stored in the storage medium of the electronic device, said method includes: obtaining a switch instruction; and switching from a first display mode to a second display mode, or from the second display mode to the first display mode according to the switch instruction; wherein, in the first display mode, m objects among the K objects are displayed; in the second display mode, n objects among the K objects are displayed; said K, m, n are integers, and 1≤m<n≤K.

Preferably, the electronic device includes a touch screen, and issues the switch instruction by touching the touch screen.

Preferably, in the case that the current display mode is the first display mode, detecting duration of touching a first predetermined area on the touch screen. If the duration exceeds a predetermined period, the electronic device switches to the second display mode.

Optionally, in the case that the current display mode is the second display mode, detecting duration of touching a first predetermined area on the touch screen. If the duration exceeds a predetermined period, the electronic device switches to the first display mode.

Preferably, in the case that the current display mode is the second display mode, if touching a second predetermined area on the touch screen is detected, the electronic device switches to the first display mode.

Optionally, in the case that the current display mode is the first display mode, if touching a second predetermined area on the touch screen is detected, the electronic device switches to the second display mode.

Preferably, by selecting one of objects displayed on the touch screen, the object will appear in the first predetermined area on the touch screen.

Preferably, by clicking an identification of the object within the first predetermined area, a page of contact information of the object is open.

Preferably, the object displaying method further includes:
obtaining an operation instruction;
starting an application according to the operation instruction;
the application invoking a first information of the object within the first predetermined area.

Preferably, said "obtaining an operation instruction" particularly refers to:
detecting an operation gesture within a second predetermined area on the touch screen, wherein an identification of an application is displayed within the second predetermined area;
said "starting an application according to the operation instruction" particularly refers to:
starting the application displayed within the second predetermined area according to the operation gesture.

According to another aspect of the invention, an electronic device is provided. K objects $[D_1, \ldots, D_K]$ are stored in storage medium of the electronic device. The electronic device includes: an obtaining unit, for obtaining a switch instruction; a mode switching unit, for switching from a first mode to a second mode, or from the second mode to the first mode according to the switch instruction; wherein, in the first mode, when a first input instruction is obtained by the obtaining unit, switching each of currently displayed objects $D_j$ to $D_{j-1}$ or $D_{j+1}$ according to the input parameter information of the first input instruction; in the second mode, when a second instruction is obtained by the obtaining unit, switching each of currently displayed objects $D_j$ is switched to $D_{j-N}$ or $D_{j+N}$ according to the input parameter information of the second input instruction, said K, j, N are integers, and $K \geq 1$, $N \geq 1$, $1 \leq j \leq K$.

preferably, the electronic device includes a touch screen, and issues the switch instruction, the first input instruction and the second input instruction by the touch screen.

Preferably, the input parameter information of the first input instruction includes the direction of the touch action, the input parameter information of the second input instruction includes at least one of the strength, the length and the speed, and the direction of the touch action.

Preferably, the mode switching unit is further used for, in the case that the current mode is the first mode, detecting the duration of touching a first predetermined area on the touch screen. If the duration exceeds a predetermined period, the mode switching unit switches to the second mode.

Optically, the mode switching unit is further used for, in the case that the current mode is the second mode, detecting the duration of touching a first predetermined area on the touch screen. If the duration exceeds a predetermined period, the mode switching unit switches to the first mode.

Preferably, the mode switching unit is further used for, in the case that the current mode is the second mode, if touching a second predetermined area on the touch screen is detected, switching to the first mode.

Preferably, the electronic device includes a mobile terminal or a portable computer.

Optically, the mode switching unit is further used for, in the case that the current mode is the first mode, if touching a second predetermined area on the touch screen is detected, switching to the second mode.

Preferably, by selecting one of objects displayed on the touch screen, the object will appear in a first determined area on the touch screen.

Preferably, by clicking identification of the object within the first predetermined area, a page of contact information of the object is open.

Preferably, the electronic device further includes:
a second obtaining unit, for obtaining an operation instruction;
a starting unit, for starting an application according to the operation instruction;
the application invoking a first information of the object within the first predetermined area.

Preferably, the second obtaining unit includes:
a detecting unit, for detecting an operation gesture within a second predetermined area on the touch screen, wherein an identification of an application is displayed within the second predetermined area;
said starting unit includes:
a sub starting unit, for starting application displayed within the second predetermined area according to the operation gesture.

According to another aspect of the invention, an electronic device is provided. K objects are stored in storage medium of the electronic device, and the electronic device includes: an obtaining unit, for obtaining a switch instruction; and a switching unit, for switching from a first display mode to a second display mode, or from the second display mode to the first display mode according to the switch instruction; wherein, in the first display mode, m objects among the K objects are displayed; in the second display mode, n objects among the K objects are displayed; said K, m, n are integers, and $1 \leq m < n \leq K$.

Preferably, the electronic device includes a touch screen, and issues the switch instruction by the touch screen.

Preferably, the switching unit is further used for, in the case that current display mode is the first display mode, detecting the duration of touching a first predetermined area on the touch screen. If the duration exceeds a predetermined period, the switching unit switches to the second display mode.

Optionally, the switching unit is further used for, in the case that current display mode is the second display mode, detecting duration of touching a first predetermined area on the touch screen. If the duration exceeds a predetermined period, the switching unit switches to the first display mode. Preferably, the switching unit is further used for, in the case that current display mode is the second display mode, if touching a second predetermined area on the touch screen is detected, switching to the first display mode.

Optionally, the switching unit is further used for, in the case that current display mode is the first display mode, if touching a second predetermined area on the touch screen is detected, switching to the second display mode. Preferably, the electronic device includes a mobile terminal or a portable computer.

Preferably, by selecting one of objects displayed on the touch screen, the object will appear in a first predetermined area on the touch screen.

Preferably, by clicking the identification of the object within the first predetermined area, a page of contact information of the object is open.

Preferably, the electronic device further includes:

a second obtaining unit, for obtaining an operation instruction;

a starting unit, for starting an application according to the operation instruction; and the application invoking a first information of the object within the first predetermined area.

Preferably, the second obtaining unit includes:

a detecting unit, for detecting an operation gesture within a second predetermined area on the touch screen, wherein an identification of an application is displayed within the second predetermined area;

the starting unit includes:

a sub starting unit, for starting the application displayed within the second predetermined area according to the operation gesture.

With the embodiments of the invention, the user can switch to display multiple objects stored in the electronic device in different modes with simple operations, as necessary, thereby realizing improvement of view efficiency and decrease of error operations, and improving user experience. Also, the user can set an object in the center of screen by clicking the object, and an identification of application can appear around the object. The application which uses information of the object can be invoked by clicking the identification of application, thereby making user's operation more convenient.

DETAILED DESCRIPTION OF THE PREFERRED EMBODIMENT

In order to make the above features and advantages more clear and easily understood, detailed explanations will be made in conjunction with specific embodiments below.

Figure 1:
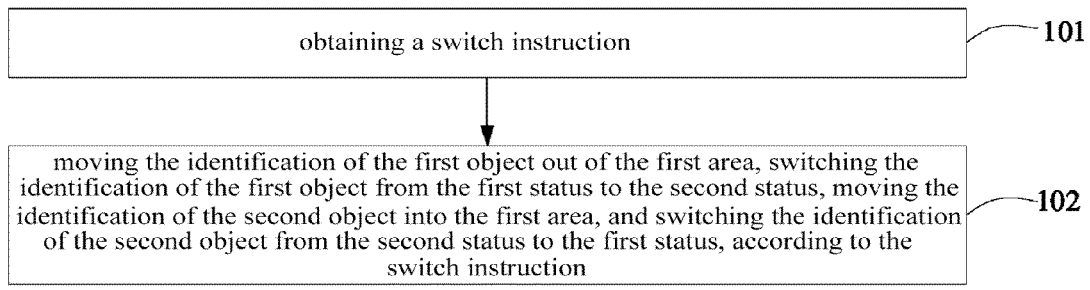
FIG. 1 is a flowchart of a method for determining object according to a first embodiment of the invention.

Referring to FIG. 1, it is a flowchart of a method for determining object according to a first embodiment of the invention. Said method is applied to a touch-sensitive portable device. Identifications of multiple objects are displayed within the display area of said portable device. Each of said identifications of multiple objects has a first status of "selected" and a second status of "unselected". Said display area has a first area, wherein an identification of a first object is displayed. Said first object is in the first status. Said method comprises the following steps:

Step 101: obtaining a switch instruction;

Step 102: moving the identification of said first object out of said first area, switching the identification of said first object from said first status to said second status, moving the identification of said second object into said first area, and changing the identification of said second object to said first status according to said switch instruction.

It can be seen that, in the embodiment of the invention, when a switch instruction is obtained, the identification of the first object can be moved out of the first area, and the identification of the second object will be moved into the first area. Apparently, said first area can only display the identification of one object, so as to make the user to operate more intuitively. What the user sees is what the user wants.

On the other hand, the object located at the first area is in the first status of "selected". At this time, when the user runs an application related to the object located in the first area, the application will be able to definitely determine that what the user selects is the object, and invoke the information of the object required for the application. Alternatively, when a specific operation is triggered, the object directed by the operation is the object located in the first area (for example, the user triggers "delete instruction" by drawing a "X" on the touch screen, and at this time, the operation object of the delete instruction is the object located in the first area). This procedure does not need to be completed by repeated and complicated user operations, thereby simplifying the user's operation steps and improving the user experience.

The present invention will be explained in detail below in combination with a more specific embodiment.

First, it should be noted that, in the embodiment of the present invention, the identification of the object located within the first area may be open by being clicked. For example, the object according to the embodiment of the present invention may be a picture of a contact in a directory of a mobile phone. What within the first area is the picture of Zhang San, and the user may open Zhang San's respective contact information page (the phone number, the e-mail address, the QQ number or the like) corresponding to the picture of Zhang San by clicking the picture of Zhang San within the first area. And the user may of course perform switching to the contacts' pictures by a slide gesture within the first area, for example, switching from Zhang San's picture to Li Si's picture. Meanwhile, the first area has a selection function. When an object displayed within the display area of portable device is located within the first area, the identification of the object is in a first status of "selected". The identification of any object entering the first area is in the first status, i.e., "selected", and the identification of any object moving out of the first area is in a second status, i.e., "unselected". According to the above examples, when the picture of Zhang San in the first area is switched to the picture of Li Si by the user's slide gesture, the picture of Li Si is in the first status of "selected", and the picture of Zhang San is in the second status of "unselected". At this time, when the user triggers "short message" application, the "short message" application will be able to directly acquire the phone number of Li Si according to the picture of Li Si which is in the selected status.

The followings are the specific implementation procedure of the selection function of the first area. The first area corresponds to a program for recording object selection in a portable device. The program is used for acquiring the object in the first area and recording the object located in the first area as the selected object, generating a piece of recording information, which represents that the object in the first area is the object selected by the user. For example, when Zhang San' picture is located within the first area (Zhang San's picture is displayed in the first area) currently, the program will record Zhang San as the currently selected object. If the user draws an "X" on the touch screen to trigger "delete instruction" at this time, the delete instruction acquires that the currently selected contact in the directory is Zhang San with the recorded information of the program, and performs deletion of the contact Zhang San (including any contact information of Zhang San, such as the phone number, the QQ number or the like). Alternatively, the user clicks "short message program" icon on the touch screen at this time, starts "short message program", the "short message program" acquires that the currently selected contact in the directory is Zhang San with the recorded information of the program, thereby further acquires the phone number of Zhang San. This specific implementation procedure is merely a specific embodiment implemented by the present invention, and does not restrict the present invention.

The identification of the object may be the icon of application, the name of application, the program icon and name corresponding to the file, the icon of a contact in the directory, the picture of a contact or the name of a contact or the like.

Figure 2:
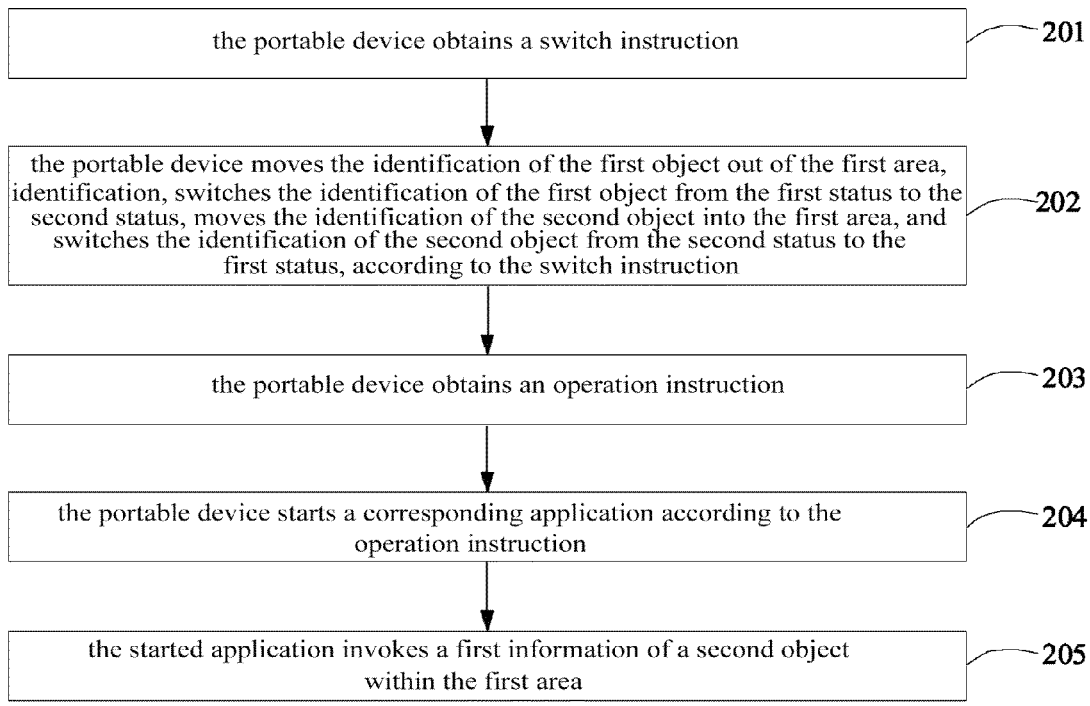
FIG. 2 is a flowchart of a method for determining object according to a second embodiment of the invention.

Referring to FIG. 2, it is a flowchart of an object determining method according to a second embodiment of the invention, which may include the following steps:

Step 201: the portable device obtains a switch instruction;

Wherein, obtaining a switch instruction by the portable device can be realized in the following manner: detecting a first slide gesture in the first area, and does not responding to the original touch point of the first slide gesture; determining a first direction of the first slide gesture; determining that a switch instruction is obtained according to the first slide gesture and the first direction.

Specific implementation procedure: when the user makes a slide gesture within the first area on the touch display screen of the portable device, at this time, the processing unit of the touch display screen of the portable device will obtain a series of points, which the processing unit processes as a track. CPU recognizes the track as a slide gesture in the first area, and generates a switch instruction (switching to the identification of the previous object or switching to the identification of the next object) of the identification of the object within the first area according to the slide gesture, meanwhile generates an instruction for canceling a click operation, and performs corresponding operations in response to the switch instruction and the instruction for canceling click operation.

Another specific implementation procedure: when the user makes a slide gesture within the first area on the touch display screen of the portable device, at this time, the processing unit of the touch display screen of the portable device will obtain a series of points, which the processing unit processes as a track, and further recognizes the track as a slide gesture in the first area (in the procedure of recognizing the track as a slide gesture, the operation instruction corresponding to the original touch point of the track is not processed, that is to say, the click operation is not generated), and triggers a switch instruction (switching to the identification of the previous object or switching to the identification of the next object) of the identification of object within the first area according to the slide gesture, transfers the switch instruction to the CPU, and the CPU performs corresponding operation in response to the switch instruction.

The above two specific implementation procedures are merely embodiments of the invention, and do not restrict the invention.

That is to say, the user can use a finger or a touch pen to slide in the first area, and at this time, the portable device will detect that a slide gesture is generated in the first area, and obtain a switch instruction according to the slide gesture and the moving direction. For example, assuming the picture or the name of Zhang San is currently displayed in the first area for identifying that the contact currently displayed within the first area is Zhang San. When the user uses one finger to slide from left in the first area of portable device (sliding within the first area, or sliding out of the first area), the portable device detects that a gesture of sliding leftward is generated in the first area. At this time, the portable device determines a switch instruction according to the gesture of sliding leftward. The portable device makes the contact Zhang San located within the first area slide out of the first area leftward, meanwhile makes the contact Li Si next to the contact Zhang San slide into the first area from the right according to the switch instruction, thereby completing the switch from the contact Zhang San to the contact Li Si. If the user uses one finger to slide rightward, the portable device detects that a gesture of sliding rightward is generated in the first area. At this time, the portable device determines a switch instruction according to the gesture of sliding rightward. The portable device makes the contact Li Si located within the first area slide out of the first area rightward, meanwhile makes the contact Zhang San previous of the contact Li Si slide into the first area from the left according to the switch instruction, thereby completing the switch from the contact Li Si to the contact Zhang San.

It is to be noted that, the user can also slide in areas other than the first area with a finger or a touch pen to trigger the switch instruction for switching the identification of the object located in the first area. That is to say, the portable device obtains the switch instruction. For example, a directory of multiple contacts (Zhang San, Li Si, Wang Wu, etc.) is displayed in the current display interface of the portable mobile device. The first area is located in a certain specific position within the current display interface and can just accommodate the directory of the next one contact. The user slides in an area other than the first area on the touch display screen to trigger the directory of contacts to begin scrolling. Then the identification of the contact scrolling into the first area at this time is in the first status of "selected" (For example the picture or the name of Wang Wu scrolls into the first area, and at this time the picture or the name of Wang Wu is in the first status of "selected"); of course, it can be understood that, the user can also slide in a particular area other than the first area to trigger a switch instruction of switching the identification of the object located in the first area. The above manners are detailed embodiments of obtaining a switch instruction by the portable device.

Step 202: the portable device moves the identification of the first object out of the first area, switches the identification of the first object from the first status to the second status, moves the identification of the second object into the first area, and switches the identification of the second object from the second status to the first status, according to the obtained switch instruction;

It is to be noted that, the portable device can move the object into or out of the first area in the first manner: as described above, the portable device obtains a switch instruction when the user triggers to switch the identification of object located in the first area, and switches the identification of the first object displayed in the first area to the identification of the second object according to the switch instruction. With the operation of the slide gesture made in the first area in the display area of the touch display screen of the portable device by the user, the picture of Zhang San is made to be moved out of the first area while the picture of Li Si is made to be moved into the first area.

In addition, the embodiment of the invention also provides another implementation manner: the user drags the frame of the first area with the finger or the touch pen and moves it in the display area, and frames the first object within the first area.

Regardless of making the identification of the first object in the first area in which manner, as long as the identification of the first object is located in the first area, the identification of the first object is in the first status of "selected". The first area corresponds to a program for recording object selection in the portable device, which is used for obtaining a first object in the first area, and recording the first object located in the first area as a selected object.

Step 203: the portable device obtains an operation instruction;

Step 204: the portable device starts corresponding application according to the operation instruction;

Step 205: the started application invokes a first information of the second object within the first area.

The operation instruction obtained by the portable device can come from a physical key (for example, "call" key on the phone), or can come from a virtual key (for example, the icon of "short message" program). That is to say, with steps 201 to step 202, the identification of one object is selected, then, with the operation instruction obtained by step 203, further operations will be performed on the identification of the object. For example: for operation instruction from the physical key, with step 201 to step 202, when the contact within the first area is switched from Zhang San to Li Si, if the user wants to call Li Si, he/she can directly press "call" key on the phone, and start Call program. At this time, the call program obtains that the currently selected in the first area is the contact Li Si from the recorded information of the program for recording object selection described above, finds communication information (for example, the phone number) corresponding to Li Si, and establishes a call connection by this communication information. For another example, if the user wants to send a short message to Li Si, he/she can click the icon of "short message" on the touch display screen, and trigger the short message program to start. The short message program obtains that the currently selected contact in the first area is Li Si from the recorded information of the program for recording object selection, finds communication information (the phone number) corresponding to Li Si. The communication information is imported into the field of "recipients". The touch display screen will display short message editing interface, with Li Si's phone number displayed in the field of "recipients".

It is to be noted that, the portable device displays the identification of one application within the second area of the display area. It can be understood that, in the embodiment, the number of the second area can be multiple, the identification of one application can be displayed within each second area, and the application displayed in each second display area can be different. For example, the identifications can be the icon of the call program, the icon of the short message program, the icon of the chat program, the icon of the e-mail program and the like. The first area and the second area are in the display area of the portable device simultaneously. Unlike from the related art, in which clicking a contact desired to contact, then popping up a menu which triggers corresponding application, the operation steps are simplified, and the user experience is improved. Also, the identification of the application displayed within the second area does not change with the change of the identification of object displayed in the first area. That is, after the object within the first area changes, the identification of application displayed in the second area remains unchanged. Obtaining the operation instruction by the portable device can be realized in the following two manners:

The first manner: the portable device detects an operation gesture within the second area of the display area, in which the identification of one application is displayed. The operation gesture can be a click operation by the user, or can be a gesture operation within the second area by the user. That is to say, the user can trigger an application corresponding to the identification of application displayed within the second area by clicking within the second area. Alternatively, the user can perform an operation gesture within the second area, use the operation gesture to trigger an application corresponding to the identification of application displayed within the second area. The operation gesture can be based on the setting of the user. For simplicity, the portable device only responds to the original touch point (that is, the operation gesture is processed as a click operation)

For example, a first area and multiple second areas are displayed simultaneously within the display area on the mobile phone with a touch display screen. Pictures of contacts are displayed on the first area. The icon of the short message program, the icon of the call program and the icon of the chat program or the like are displayed respectively on multiple second areas. Assuming that the picture of Li Si is displayed within the first area at this time, the program for recording object selection will record that the currently selected object is the contact Li Si. The user clicks within the second area to trigger the short message program corresponding to the icon of the short message application displayed within the second area. The short message program finds that the currently selected contact is Li Si by the recording program, thereby determines the user needs to contact with Li Si, then finds the phone number corresponding to the short message program of Li Si by the selection information, and imports the phone number into the field of recipients. The touch display screen will display the short message editing interface, with the phone number of Li Si displayed in the field of "recipients". What the user needs to do next is just editing a short message.

The second manner: the portable device detects a second slide gesture, with the original touch point of the second slide gesture does not been responded to and the original touch point located within the first area. The display area of portable device also has a second area, likewise, the identification of one application is displayed in the second area, each application on the display area has a second area; the portable device determines a second direction of the second slide gesture, which is directed to the second area; the portable device determines an operation instruction according to the second slide gesture and the second direction.

Taking the mobile phone with the touch display function as described above as an example. A first area and multiple second areas are displayed simultaneously within the display area of the mobile phone. The picture of a contact is displayed on the first area. The icon of the short message program, the icon of the call program, and the icon of chat program or the like are displayed respectively on multiple second areas. The first area is located in the center of the display area of the mobile phone. Multiple second areas are around the first area. Assuming that above the first area on the touch display screen is a second area which displays the icon of "call program". If the user wants to call the contact Li Si corresponding to the identification of Li Si displayed within the first area, he/she can take one point within the first area as a start point, use a finger or a touch pen to slide toward the top of the first area. The Call program is started at this time, and the call connection with Li Si is established.

The implementation procedure of not responding to the original touch point of the second slide gesture has been described before, thus descriptions thereof is omitted here.

Determining the second area according to the second direction can be realized in the following manner.

Figure 3:
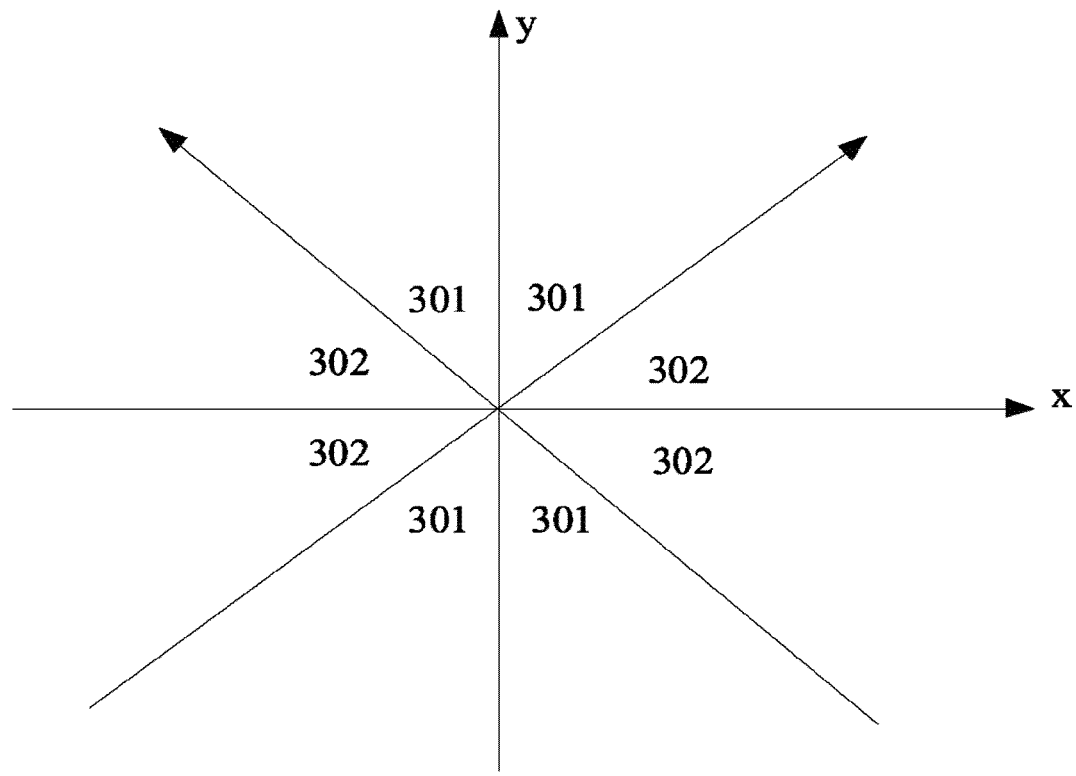
FIG. 3 is a schematic diagram of determining a second area based on a second direction of the embodiment of the invention.

Referring to FIG. 3, it is a schematic view of determining the second area according to the second direction of the embodiment of the invention. In FIG. 3, the origin represents the original touch point of the second slide gesture. 301 represents the second slide gesture is in the vertical direction. 302 represents the second slide gesture is in the horizontal direction. The angle of each of numerals 301 and 302 is 45 degrees. When the second slide gesture falls into the range of any 301, the second slide gesture represents a movement in the vertical direction. When it points to the positive direction of Y axis, the second slide gesture represents the second area above the first area. When it points to the negative direction of y axis, the second slide gesture represents the second area below the first area. When the second slide gesture falls into the range of any 302, the second slide gesture represents a movement in the horizontal direction. When it points to the positive direction of X axis, the second slide gesture represents the second area to the right of the first area. When it points to the negative direction of X axis, the second slide gesture represents the second area to the left of the first area. Of course, the angle of each numerals 301 can be 30 degrees, and the angle of each numerals 302 can be 60 degrees.

In the embodiment, the specific implementation procedure of the second implementation is by pre-defining the specific direction of the second slide gesture within the first area to start a corresponding application. At this time, the second area and the first area are displayed simultaneously, for prompting the user to slide in the direction from the first area to the second area to start the application corresponding to the identification of the application displayed in the second area. In this way, the user experience of what he/she sees is what he/she gets is satisfied, and the user does not have to deliberately memory that a certain direction corresponds to the start of a certain application. Of course, it can be understood that, in the second implementation mode of the embodiment, the second area may be not displayed, then it requires the user to memory a certain application corresponding to a certain direction. For example, in the example of the above mobile phone, an upward second slide gesture in the first area is defined to correspond to start the call program, and a downward second slide gesture in the first area is defined to correspond to start the short message program. A leftward second slide gesture in the first area is defined to correspond to start the chat program, and a rightward second slide gesture in the first area is defined to correspond to start the e-mail program or the like. When the user performs a pre-defined second slide gesture in the first area of the display area of the mobile phone with the finger or the touch pen, the mobile phone determines to start the corresponding application according to the second slide gesture and the direction of the second slide gesture. In order to design the mobile phone more feasibly, and not to conflict with the switching of the pictures of the contacts within the first area by the first slide gesture and the direction of the first slide gesture (leftward or rightward), four directions of upper left, lower left, upper right and lower right of the second slide gesture can be pre-defined to correspond to applications.

In another embodiment of the invention, in addition to the identification of the application, the identification of the operation instruction can also be displayed in the second area. For example, a word "delete" is displayed in the second area. In the above example, when the user performs a click operation within the second area, the mobile phone will perform a delete instruction, then the object of the delete operation is the communication information on the contact Li Si which corresponds to the identification of Li Si in the selected status located within the first area.

Of course, it can be understood that, the method provided by the embodiment of the invention can be applied not only to the mobile phone with a touch display function, but also to a notebook computer with a touch display function. The specific procedure is as follows. Take the deletion of a word document B displayed on the touch display screen as an example. Assuming the identification of a word document A is currently displayed in the first area. When the user uses one finger to slide leftward in the first area, the portable device detects that a gesture of sliding leftward is generated in the first area. The portable device moves the identification of the current word document A out of the first area, and switches the identification of current word document A from the first status to the second status of unselected. Meanwhile, the portable device moves the identification of the next word document B of the current word document A into the first area, and switches the identification of word document B which is just moved into the first area from the second status of unselected to the first status of selected. The user further uses an entity key or a virtual key to issue a delete instruction to the portable device. At this time, the object of the delete instruction is word document B in the selected status located within the first area. According to the record of the program for recording object selection, information on the word document B currently selected is obtained, and the deletion of word document B is performed.

It is to be noted that, the method provided by the embodiment of the invention is applied to a portable mobile device with touch function (a mobile phone or a tablet computer). Preferably, when the portable mobile device with touch function (the mobile phone or the tablet computer) displays at least the first area or displays the first area and the second area, a virtual navigation key or a virtual keyboard is not displayed within the display area, or the portable mobile device (the mobile phone or the tablet computer) itself does not have specific physical navigation key or pointing device (trackball or the like).

It can be seen that, in the embodiment of the invention, after a switch instruction is obtained, the identification of the first object can be moved out of the first area, and the identification of the second object will enter into the first area. It is apparently that, only the identification of one object can be displayed in the first area, thereby making the user to operate more intuitively. What the user sees is what the user wants.

On the other hand, the object located in the first area is in the first status of "selected". At this time, when the user runs application related to the object located in the first area, the application will be able to definitely determine what the user selected is an object, and invoke information on the object which is required by the application. Alternatively, when a specific operation is triggered, the object directed by the operation is object located within the first area (for example, when the user triggers "delete instruction" by drawing an "X" on the touch screen, the operation object of the delete instruction is the object located within the first area). This procedure does not require to be completed by repeated and complicated operations, thereby simplifying user's operation steps, and improving user experience.

In addition, the method provided by the embodiment of the invention can also include switching to K objects [$D_1, \ldots, D_K$], wherein switching to K objects [$D_1, \ldots, D_K$] includes: obtaining a second switch instruction; switching from a first mode to a second mode, or from the second mode to the first mode according to the second switch instruction; wherein, in the first mode, when a first input instruction is obtained, in the case that the first object is $D_j$, the second object is $D_{j-1}$ or $D_{j+1}$ according to the input parameter information of the first input instruction; in the second mode, when a second input instruction is obtained, in the case that the first object is $D_j$, the second object is $D_{j-N}$ or $D_{j+N}$ according to the input parameter information of the second input instruction; said K, j, N are integers, and K≤1, N≤1, 1≤j≤K.

In addition, the method provided by the embodiment of the invention can also include displaying K objects, which includes: obtaining a second switch instruction; and switching from a first display mode to a second display mode, or from the second display mode to the first display mode according to the second switch instruction; wherein, in the first display mode, displaying m objects among K objects; in the second display mode, displaying n objects among K objects; said K, m, n are integers, and 1≤m<n≤K.

In this way, the user is enabled to further switch to multiple objects stored in the electronic device in different modes with simple operations as necessary, thereby realize the improvement of view efficiency and decrease of error operations, and further improving the user experience.

Figure 4:
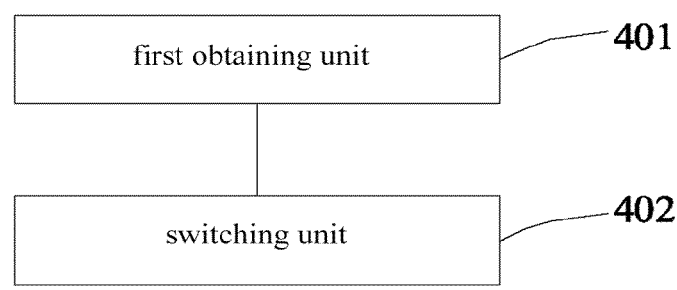
FIG. 4 is a schematic diagram of a portable device provided by a third embodiment of the invention.

Referring to FIG. 4, it is a schematic view of a portable device according to the third embodiment of the invention, said portable device can include:
a first obtaining unit 401, for obtaining a switch instruction;
a switching unit 402, for moving the identification of the first object out of the first area, switching the identification of the first object from the first status to the second status, moving the identification of the second object into the first area, and switching the identification of the second object from the second status to the first status, according to the switch instruction.

Figure 5:
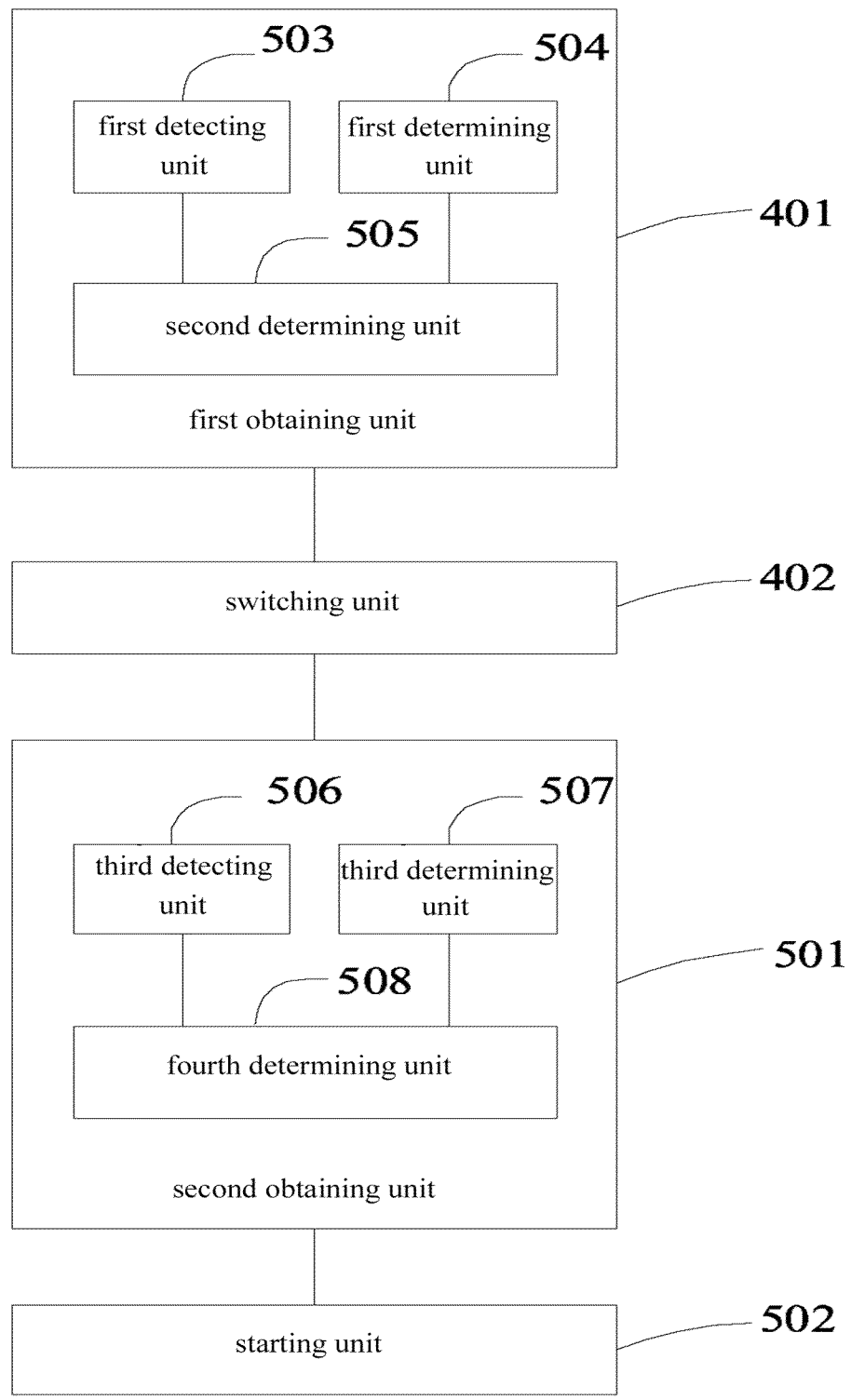
FIG. 5 is a schematic diagram of a portable device provided by a fourth embodiment of the invention.

Referring to FIG. 5, it is a schematic view of a portable device provided by the fourth embodiment of the invention. Based on FIG. 4, the portable device can further include:
a second obtaining unit 501, for obtaining an operation instruction;
a starting unit 502, for starting an application according to the operation instruction, the application invoking a first information of the second object within the first area.

The first obtaining unit 401 can include:
a first detecting unit 503, for detecting a first slide gesture in the first area, and not responding to the original touch point of the first slide gesture;
a first determining unit 504, for determining a first direction of the first slide gesture;
a second determining unit 505, for determining the switch instruction according to the first slide gesture and the first direction.

The second obtaining unit 501 can include:
a second detecting unit (not illustrated), for detecting a operation gesture within the second area of the display area of the portable device, wherein, the identification of an application is displayed within the second area;

The starting unit 502 can include:
sub starting unit (not illustrated), for starting the application displayed within the second area according to the operation gesture.

The second obtaining unit 501 can include:
a third detecting unit 506, for detecting a second slide gesture, and not responding to the original touch point of the second slide gesture, and the original touch point is located within the first area, the display area of the portable device also has the second area, and the identification of an application is displayed within the second area;
a third determining unit 507, for determining a second direction of the second slide gesture, wherein, the second direction points to the second area;
a fourth determining unit 508, for determining an operation instruction according to the second slide gesture and the second direction.

It can be seen that, in the embodiment of the invention, after a switch instruction is obtained, the identification of the first object can be moved out of the first area, and the identification of the second object will come into the first area. It is apparently that, only identification of one object can be displayed within the first area, thereby making the user to operate more intuitively. What the user sees is what the user wants!

On the other hand, the object located in the first area is in a first status of being selected. At this time, when the user runs an application related to the object located in the first area, the application will be able to definitely determine what the user selected is the object, and invoke information on the object which is required by the application. Or when a specific operation is triggered, the object directed by the operation is the object located within the first area (for example, when the user triggers "delete instruction" by drawing an "X" on the touch screen, the operation object of the delete instruction is object located within the first area). This procedure does not need to be completed by the user's repeated and complicated operation, thereby simplifying the user's operation steps, and improving user experience. The portable device includes a mobile terminal or a notebook computer.

In addition, the portable device provided by the embodiment of the invention can also include means for performing switch on K objects [$D_1, \ldots, D_K$], wherein said means for performing switch to K objects [$D_1, \ldots, D_K$] includes: a third obtaining unit (not illustrated), for obtaining a second switch instruction; a mode switching unit (not illustrated), for switching from a first mode to a second mode, or from the second mode to the first mode according to the second switch instruction; wherein, in the first mode, when a first input instruction is obtained, in the case that the first object is $D_j$, the second object is $D_{j-1}$ or $D_{j+1}$ according to the input parameter information of the first input instruction; in the second mode, when a second input instruction is obtained, in the case that the first object is $D_j$, the second object is $D_{j-N}$ or $D_{j+N}$ according to the input parameter information of the second input instruction; said K, j, N are integers, and K≥1, N≥1, 1≤j≤K.

In addition, the portable device provided by the embodiment of the invention can also include means for displaying K objects, said means for displaying K objects includes: a third obtaining unit (not illustrated), for obtaining a second switch instruction; and a mode switching unit (not illustrated), for switching from a first display mode to a second display mode, or from the second display mode to the first display mode according to the second switch instruction; wherein, in the first display mode, m objects among K objects are displayed; in the second display mode, n objects among K objects are displayed; said K, m, n are integers, and 1≤m<n≤K.

In this way, the user is enabled to further switch multiple objects stored in the electronic device in different modes with simple operations as necessary, thereby realizing the improvement of view efficiency and decrease of error operations, and further improving the user experience.

Figure 6:
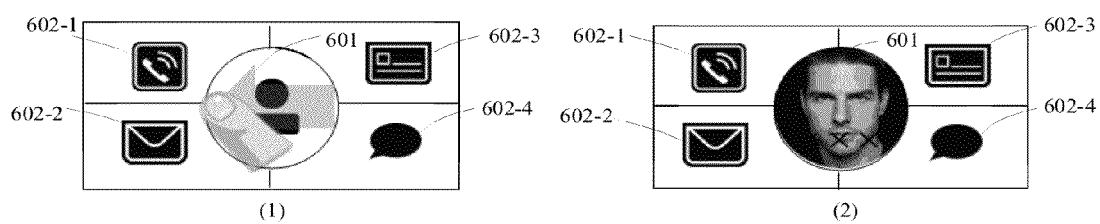
FIG. 6 is a schematic diagram of the case wherein a user switches contacts on the touch display screen using the mobile terminal provided by the embodiment of the invention.

Referring to FIG. 6, it is a schematic view of switching contacts on touch display screen by the user using the mobile terminal (for example, mobile phone) provided by the embodiment of the invention. Assuming the switch instruction corresponding to sliding leftward on the touch display screen with the finger by the user is switching to the next contact, the switch instruction corresponding to sliding rightward is switching to the previous contact. In FIG. 6, 601 is first area. The identification of directory is displayed in 601. Each of 602-1, 602-2, 602-3 and 602-4 is the second area, and 602-1 is the identification of making a call, 602-2 is the identification of sending a short message, 602-3 is the identification of sending an E-mail, and 602-4 is the identification of contact instant communication. In FIG. 1) of FIG. 6, the user can click in any areas, wherein 601 is the first area, and each of 602-1, 602-2, 602-3 and 602-4 is the second area, thereby starting the application corresponding to the identification of the application displayed in first area and multiple second areas. The user slides leftward in the first area 601 of touch display screen with finger. The start point of the slide gesture is located within the first area 601, and the start point does not responded to by the mobile terminal. The mobile terminal obtains a switch instruction to a switch contact, and the mobile terminal moves the icon of the next contact into the first area. Referring to FIG. 2) of FIG. 6, the mobile terminal switches the picture of the next contact to the first area 601, and at this time, when the user clicks in any areas of 602-1, 602-2, 602-3 and 602-4, the application corresponding to the identification of the application displayed in respective 602-1, 602-2, 602-3 and 602-4 is triggered to start, and the communication connection to the contact corresponding to the identification of the contact displayed in the first area is automatically established (that is, while starting the application, in the interface of the application, information related to the contact is displayed at the respective position, and can be used by the application). Particularly, it can be achieved in the following two background process manners: 1. the application obtains the record information of the identification of the contact displayed in the first area from the record information of the program for recording object selection corresponding to the first area, finds communication information related to the corresponding contact according to the record information. For example, the user clicks in 602-2 to start the short message application corresponding to the identification of sending short messages, the program of sending short messages imports the phone number of the contact corresponding to the icon of the contact displayed in the first area 601 to the field of recipients of the short message program; 2. when the current display of the first area is switched from the identification of a first contact to the identification of a second contact (when the identification of a second contact is located within the first area), according to the application corresponding to the identification of application displayed in multiple second areas, communication information related to the contact corresponding to the identification of a second contact is imported into respective application, and at this time, the user directly clicks in the second area to directly establish the communication connection with the second contact. For example, when the icon of Zhang San is located in the first area, the mobile terminal imports information related to the contact Zhang San corresponding to the icon of Zhang San into respective application, according to the identifications of applications respectively displayed in multiple second areas (importing the phone number of Zhang San into the short message program, importing the QQ number of Zhang San into the chat program, etc.)

Figure 7:
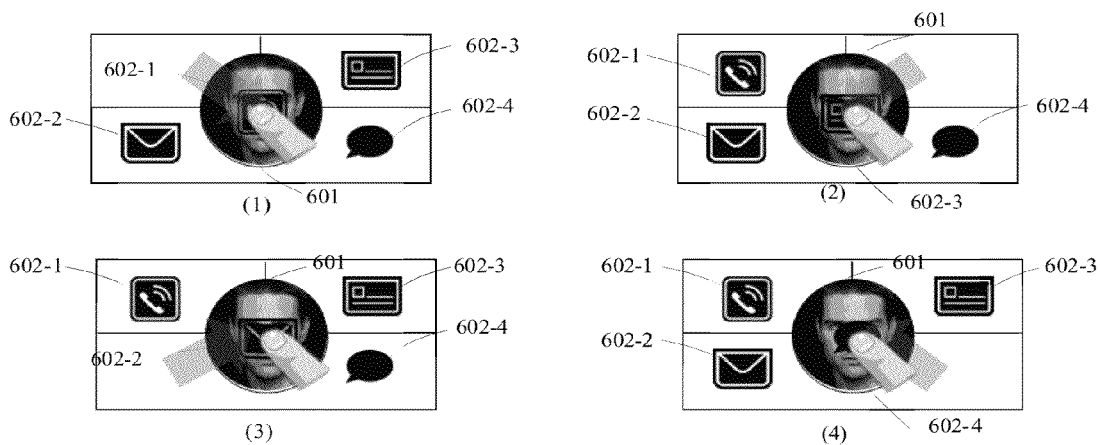
FIG. 7 is a schematic diagram of operations further performed after the user selects a contact.

Referring to FIG. 7, it is another way of user's specific operation. Based on FIG. 6(2), if the user wants to call the selected contact, referring to figure (1) of FIG. 7, the user slides on the second area 602-1 which has "call" program icon with finger. The start point of slide is located in the second area 602-1, and the direction of the slide points to the first area 601. At this time, mobile terminal only responds to the start point of the slide, and "call" program is triggered to establish a call connection to the contact automatically according to the contact number of the contact selected by the user. Alternatively, slide gestures in four directions of upper left, upper lower, upper right and lower right in the first area 601 are pre-defined to correspond to start the call program, the short message program, the e-mail program, the chat program (alternatively, for example, the blog address of the corresponding contact in the browser program and the like), respectively; in this way, it can be distinguished from the leftward or rightward slide gesture corresponding to switching the identification of the contact, and the problem of error touch is solved. Preferably, four second areas of 602-1, 602-2, 602-3 and 602-4 can be set in four directions of upper left, lower left, upper right and lower right of the first area 601, and the icons of the call program, the short message program, the e-mail program and the chat program are respectively displayed in the four second areas for instructing the user to operate. The user can slide to the second area of the application icon that he/she wants to trigger from the first are according to his/her selection. The user does not have to memory that a certain direction corresponds to a certain application, which improves user experience.

Figure 8:
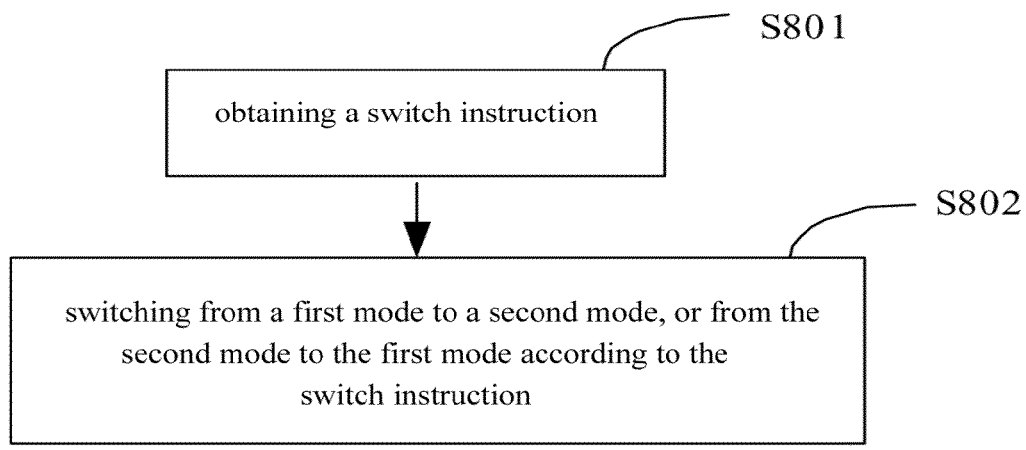
FIG. 8 is a flowchart of object switching method according to another embodiment of the invention.

Referring to FIG. 8, FIG. 8 is a flowchart of object switching method according to another embodiment of the invention. The method is used for switching the display of K objects [$D_1, \ldots, D_K$] stored in the storage medium of electronic device, and includes the following steps:

step S801: obtaining a switch instruction;

step S802: switching from a first mode to a second mode, or from a second mode to a first mode according to the switch instruction;

wherein, in the first mode, when a first input instruction is obtained, according to the input parameter information of the first input instruction, each object $D_j$ currently displayed is switched to $D_{j-1}$ or $D_{j+1}$;

in the second mode, when a second input instruction is obtained, according to the input parameter information of the second input instruction, each object $D_j$ currently displayed is switched to $D_{j-N}$ or $D_{j+N}$;

said K, j, N are integers, and K≥1, N≥1, 1≤j≤K.

With the embodiment of the invention, when the electronic device obtains a switch instruction, a first mode can be switched to a second mode, or the second mode can be switched to the first mode. Thus, the user can switch the current mode to a desired mode by a simple switch instruction, such as a key-action-triggered instruction or a touch-action-triggered instruction.

Accordingly, in the case that the user wants to view objects one by one, it can be switched to the first mode. In this mode, the electronic device switches each object currently displayed to adjacent previous object or next object respectively, according to the input parameter information of the first input instruction, thereby decreasing the possibility of error operation; in the case that the number of objects is large and the user wants to view whole objects, it can be switched to the second mode. In this mode, the electronic device switches each object currently displayed to object which is N objects away, the value of N is determined according to the input parameter information of the second input instruction, thereby improving the efficiency of viewing objects by user. Therefore, with the embodiment of the invention, the user can perform switch and display on multiple objects stored in electronic device in different modes by a simple operation, as necessary, thereby realizing the improvement of view efficiency and decrease of error operation, and improving user experience.

Hereinafter, taking the electronic device with a touch screen as an example, the embodiment of the invention will be explained in more detail.

In the embodiment, when the user wants to switch the current mode, he issues a switch instruction by a touch action to the touch screen in the electronic device.

In the case that the current mode is the first mode described in more detail below, said switch for example is occurred in the following manner: the duration of touching a first predetermined area on the touch screen is detected; if the duration exceeds a predetermined period, it is switched to a second mode. The first predetermined area, for example, is an object display area on the touch screen in the first mode. Alternatively, the first predetermined area can be any area preset by the electronic device or self-defined by the user. The predetermined period can be any period preset by the electronic device or self-defined by the user.

In the case that the current mode is the second mode described in more detail below, said switch for example is occurred in the following manner: whether touching a second predetermined area on the touch screen is detected; if it is detected that the second predetermined area on the touch screen is touched, it is switched to the first mode. The second predetermined area, for example, is an area other than object display area on the touch screen in the second mode. Alternatively, the second predetermined area can be any area preset by the electronic device or self-defined by the user.

Furthermore, it is to be noted that, said switch is not limited to be performed in the two manners described above. For example, in the case that the current mode is the first mode, said switch can occur by detecting touching on the first predetermined area on the touch screen; in the case that the current mode is the second mode, said switch can occur by detecting that the duration of touching on the second predetermined area on the touch screen exceeds a predetermined period. Said switch can also occur by any touch gesture preset by the electronic device or self-defined by the user. Also, in the case that the current mode is the second mode, the duration of touching on the first predetermined area on the touch screen, if the duration exceeds a predetermined period, it is switched to the first mode. Alternatively, in the case that the current mode is the first mode, if it is detected that the second predetermined area on the touch screen is touched, it is switched to the second mode.

Wherein, in the first mode, when a first input instruction is obtained, according to the input parameter information of the first input instruction, each object $D_j$ ($1 \leq j \leq K$) currently displayed is switched to the previous object $D_{j-1}$ or the next object $D_{j+1}$.

Wherein, the first input instruction, for example, is generated by a slide action on the touch screen. Alternatively, the first input instruction can be generated by a touch gesture different from the gesture generating the above switch instruction, for example, a press action on a predetermined input area on the touch screen. The first input instruction can also be an instruction based on key operation.

The input parameter information for example is the direction of the slide, the area of the press or the operation of the predetermined key. The electronic device determines the switching direction of the object according to the input parameter information of the first input instruction, thereby determining whether each object among objects currently displayed is switched to the previous object or the next object. It is to be noted that, those skilled in the art can user any other method to determine the switching direction of the object based on the input parameter information, which are included in the scope of the invention.

Furthermore, preferably, in the case that a certain object $D_j$ among objects currently displayed is the last object $D_K$ among K objects $[D_j, \ldots, D_K]$ stored in memory (i.e., when j=K), when the input parameter information of the first input instruction indicates switching the currently displayed object to the next object, if the K objects are stored in the electronic device in non-end-to-end manner (no circular manner), the electronic device may not perform switching on the currently displayed object; alternatively, if K objects are stored in the electronic device in end-to-end manner (circular manner), that is, in this case, the object $D_K$ is adjacent to the object $D_1$, the electronic device can switch the object $D_j$ to the first object $D_1$ among K objects (i.e., $D_{j+1}=D_1$).

Similarly, in the case that a certain object $D_j$ among the currently displayed objects is the first object $D_1$ among K objects $[D_1, \ldots, D_K]$ stored in memory (that is, when j=1), when the input parameter information of the first input instruction indicates switching the currently displayed object to the previous object, if the K objects are stored in the electronic device in non-circular manner, the electronic device may not perform switching on the currently displayed object; alternatively, if the K objects are stored in the electronic device in circular manner, that is, in this case, object $D_K$ is adjacent to object $D_1$, the electronic device can switch the object $D_j$ to the previous object $D_K$ among K objects (i.e., $D_{j-1}=D_K$).

Therefore, in the first mode, the electronic device switches each currently displayed object to the adjacent previous object or next object.

Furthermore, in the second mode, when a second input instruction is obtained, according to the input parameter information of the second input instruction, each currently displayed object $D_j$ is switched to $D_{j-N}$ or $D_{j+N}$; said K, j, N are integers, and $K \geq 1$, $N \geq 1$, $1 \leq j \leq K$.

Similarly with the above first input instruction, the second input instruction is generated, for example, by a slide action on the touch screen. Alternatively, the second input instruction can be generated by any touch gesture different from the above switch instruction, for example, a press action on a predetermined input area on the touch screen. The second input instruction can also be an instruction based on key operation. The input parameter information for example includes the slide direction, the pressed area or the operation of predetermined key. In addition, the input parameter information also includes at least one of the length, the strength and the slide speed.

The electronic device determines to switch each object $D_j$ of currently displayed objects to $D_{j-N}$ or $D_{j+N}$ according to the input parameter information of the second input instruction. Specifically, the electronic device determines the value of N according to at least one of the length, the strength and the speed of the slide included in the input parameter information, and determines the switch direction according to at least one of the slide direction, the pressed area or the operation of predetermined key and the like included in the input parameter information, thereby determining whether switching object $D_j$ to $D_{j-N}$ or $D_{j+N}$. It is to be noted that, those skilled in the art can user any other method to determine the switching direction of the object and the value of N based on the input parameter information, which are included in the scope of the invention.

In addition, preferably, after the value of N is determined, in the case that for a certain object $D_j$ among currently displayed objects, the electronic device judged that j+N−1≥K, if the K objects are stored in the electronic device in non-circular manner, the electronic device may not perform switch on the currently displayed object; alternatively, if K objects are stored in the electronic device in circular manner, that is, in this case, the object $D_K$ is adjacent to the object $D_1$, the electronic device can switch the object $D_j$ to $D_{(j+N) mod(K)}$, that is, $D_{j+1}=D_{(j+N)mod(K)}$, wherein mod(K) represents a remainder operation with K as a divisor.

Similarly, after the value of N is determined, in the case that for a certain object $D_j$ among the currently displayed objects, the electronic device judged that j+N−1≤K, if the K objects are stored in the electronic device in non-circular manner, the electronic device may not perform switch on the currently displayed objects; alternatively, if the K objects are stored in the electronic device in circular manner, that is, in this case, the object $D_K$ is adjacent to the object $D_1$, the electronic device can switch the object $D_j$ to $D_{|j-N|mod(K)}$, that is, $D_{j+1}=D_{|j-N|mod(K)}$, wherein mod(K) represents a remainder operation with K as a divisor.

Therefore, in the second mode, the electronic device switches each currently displayed object to an object which is N objects away according to the second input instruction, as described above, N≥1.

It is to be noted that, the embodiment of the invention has been described above taking the electronic device with a touch screen as an example. However, the invention is not limited to this. The above switch instruction, the first input instruction and the second input instruction can also be generated using keys of the electronic device. In this case, the input parameter information of the first input instruction and the second input instruction for example includes the predetermined key representing switch direction, the duration of key and the like.

In addition, the object can appear in a first predetermined area on the touch screen by selecting one of the objects displayed on touch screen.

In addition, the page of contact information of the object can be open by clicking the identification of the object within the first predetermined area.

In addition, the object switch method according to the embodiment of the invention can further include: obtaining an operation instruction according to the operation instruction; starting an application; the application invokes a first information of the object within the first predetermined area.

In addition, said obtaining an operation instruction can include: detecting an operation gesture within a second predetermined area on the touch screen, wherein the identification of an application is displayed within the second predetermined area; said starting an application according to the operation instruction can include: starting the application displayed within the second predetermined area according to the operation gesture.

Therefore, with the above embodiment of the invention, in the case that the user wants to view objects one by one, it can be switched to the first mode; in the case that the number of objects is large and the user wants to view the whole objects, it can be switched to the second mode, thereby the user can perform switch and display on multiple objects stored in the electronic device in different modes by a simple operation, as necessary, thereby realizing the improvement of view efficiency and decrease of error operation, and improving user experience. Also, the user can set an object in the center of screen by clicking the object, and the identification of the application can appear around the object. Clicking the identification of application can invoke the application which uses information on the object, thereby making user's operation more convenient.

Figure 9:
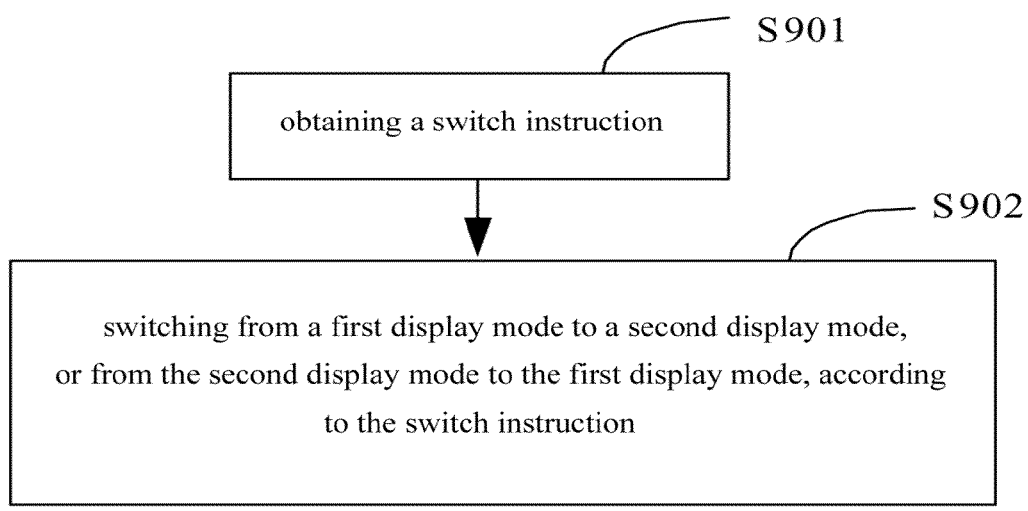
FIG. 9 is a flowchart of object displaying method according to another embodiment of the invention.

Then, referring to FIG. 9, FIG. 9 is a flowchart of object display method according to an embodiment of the invention. The object display method is used for displaying K objects stored in a storage medium of electronic device, and includes the following steps:

step S901: obtaining a switch instruction;

step S902: switching from a first display mode to a second display mode, or from the second display mode to the first display mode according to the switch instruction;

wherein, in the first display mode, m objects among the K objects are displayed;

in the second display mode, n objects among the K objects are displayed;

said K, m, n are integers, and 1≤m<n≤K.

Similarly with the above embodiment, when the user wants to switch the current display mode, he/she issues a switch instruction by a touch action on touch screen in the electronic device. In the case that the current display mode is the first display mode, said switch occurs in the following manner: detecting the duration of touching a first predetermined area on the touch screen; if the duration exceeds a predetermined period, it is switched to the second display mode. The first predetermined area for example is the object display area on the touch screen in the first display mode. Alternatively, the first predetermined area can be any area preset by the electronic device or self-defined by the user. The predetermined period can be any period preset by the electronic device or self-defined by the user.

In the case that the current display mode is the second display mode, said switch occurs in the following manner: detecting whether a second predetermined area on the touch screen is touched; if it is detected that the second predetermined area on the touch screen is touched, it is switched to the first display mode. The second predetermined area for example is an area other than the object display area on the touch screen in the second mode. Alternatively, the second predetermined area can be preset by the electronic device or self-defined by the user.

Furthermore, it is to be noted that, said switch is not limited to occur in the above two manner. For example, in the case that the current display mode is the first display mode, said switch can occur by detecting touching on the first predetermined area on the touch screen; in the case that the current display mode is the second display mode, said switch can occur by detecting that the duration of touching on the second predetermined area on the touch screen exceeds a predetermined period. Said switch can also occur by any touch gesture preset by the electronic device or self-defined by the user. Also, in the case that the current mode is the second mode, the duration of touching on the first predetermined area on the touch screen is detected; if the duration exceeds a predetermined period, it is switched to the first mode. Alternatively, also, in the case that the current mode is the first mode, if it is detected that the second predetermined area on the touch screen is touched, it is switched to the second mode.

As described above, in the first display mode, m objects among the K objects are displayed; in the second display mode, n objects among the K objects are displayed, wherein n>m. That is to say, in the two display modes, the numbers of displayed objects are different. This can be realized by the change of the whole object display area or the change of the display size of each object.

In addition, by selecting one of the objects displayed on the touch screen, the object can appear in a first predetermined area on the touch screen.

In addition, the page of contact information of the object can be open by clicking the identification of the object within the first predetermined area.

In addition, the object display method according to the embodiment of the invention can further include: obtaining an operation instruction; starting an application according to the operation instruction; the application invokes a first information of the object within the first predetermined area.

In addition, said obtaining an operation instruction can include: detecting an operation gesture within a second predetermined area on the touch screen, wherein the identification of an application is displayed within the second predetermined area; said starting an application according to the operation instruction can include: starting the application displayed within the second predetermined area according to the operation gesture.

Therefore, with the above embodiment of the invention, the user can view different numbers of objects in two display modes utilizing a simple operation, thereby displaying less objects or displaying more objects according to the user's need, and improving user experience.

Furthermore, preferably, after switching from the first display mode to the second display mode, m objects last displayed in the first display mode immediately before switching are included in the n objects currently displayed in the second display mode, and the m objects are, for example, displayed in highlighted, enlarged, centered manner etc., so as to be distinguished from the other objects among the currently displayed n objects. Thus, after switching to the second display mode, the user can recognize the position of the m objects previously displayed in the first display mode among the whole objects. Furthermore, after switching from the second display mode to the first display mode, at least one of n objects last displayed in the second display mode immediately before switching is included in the m objects currently displayed in the first display mode, and is for example displayed in highlighted, enlarged, centered manner etc. Thus, the continuity of view operation in two display modes is ensured, and user experience is improved. Also, the user can set an object in the center of screen by clicking the object, and the identification of application can appear around the object. Clicking the identification of application can invoke the application which uses the information on the object, thereby making user's operation more convenient.

It is to be noted that, the embodiment of the invention is described taking the electronic device with a touch screen as an example. However, the invention is not limited to this, and the switch instruction described above can also be generated by using keys of the electronic device.

Figure 10:
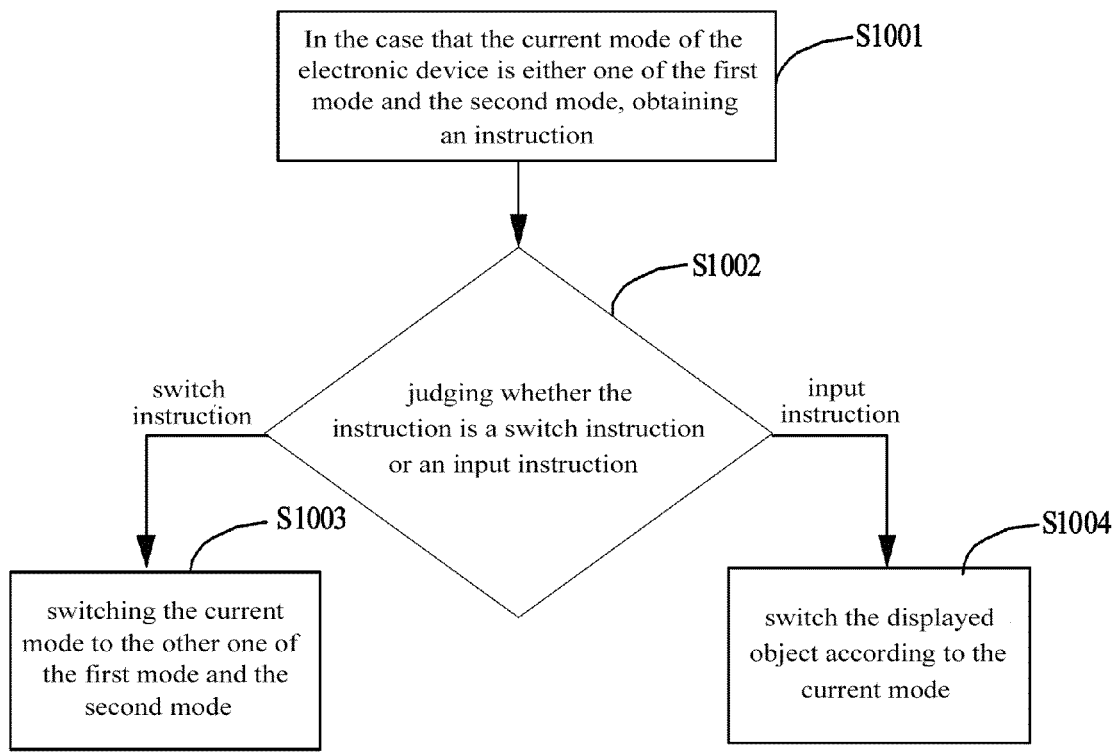
FIG. 10 is a flowchart of object switching method according to another embodiment of the invention.

Next, referring to FIG. 10, FIG. 10 is a flowchart of object switch method according to another embodiment of the invention. The method is used in an electronic device. K objects [$D_1, \ldots, D_K$] are stored in the storage medium of the electronic device, and the current mode of the electronic device is either one of first mode and second mode. Said method includes the following steps:

step S1001: obtaining a instruction;

step S1002: judging whether the instruction is a switch instruction or an input instruction;

As described above with reference to FIG. 8, in the case that the electronic device includes a touch screen, the switch instruction and the first input instruction can be issued by two different touch gestures. Furthermore, in the case that the electronic device includes keys, the switch instruction and the first input instruction can be issued by two different key operations. Detecting and judging the touch gesture and the direction of key operation are well known to those skilled in the art, thus description thereof is omitted herein.

step S1003: in the case that the instruction is a switch instruction, the current mode is switched to the other one of first mode and second mode;

That is to say, in the case that the current mode is the first mode, it is switched to the second mode; in the case that the current mode is the second mode, it is switched to the first mode.

step S1004: in the case that the instruction is an input instruction, performing switch to objects according to the current mode.

Particularly, in the case that the current mode is the first mode, each of the currently displayed objects $D_j$ is switched to $D_{j-1}$ or $D_{j+1}$ according to the input parameter information of the input instruction (at this time, corresponding to the first input instruction described above with reference to FIG. 8); in the case that the current mode is the second mode, each of currently displayed objects $D_j$ is switched to $D_{j-N}$ or $D_{j+N}$ according to the input parameter information of the input instruction (at this time, corresponding to the second input instruction described above with reference to FIG. 8). Wherein said K, j, N are integers, and K≥1, N≥1, 1≤j≤K.

In the embodiment described above, the meanings of the switch instruction, the input instruction, the first mode and the second mode has been described above in details with reference to FIG. 8, thus the repeated description is omitted herein.

According to the embodiment of the invention, when the user inputs an instruction, the electronic device can judge the type of the instruction, and switch the current mode or correspondingly switch the display object in the current mode according to the result of judgment, thereby making user's operation convenient.

Figure 11:
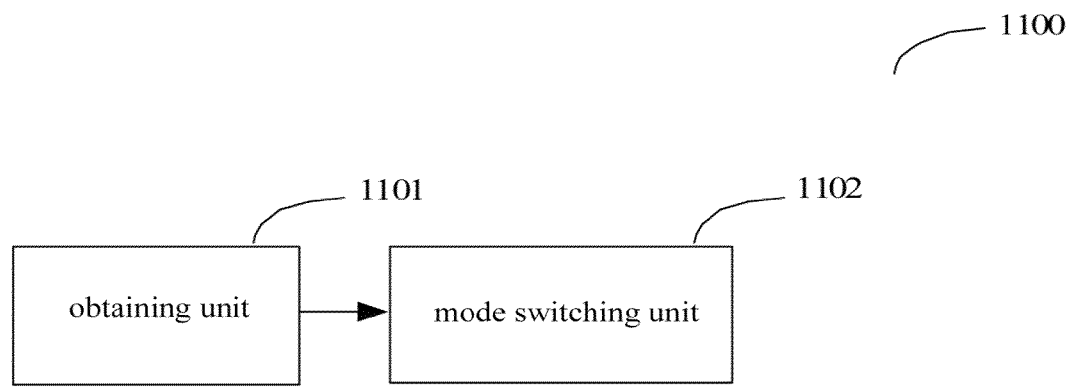
FIG. 11 is a block diagram of an electronic device according to another embodiment of the invention.
Figure 12:
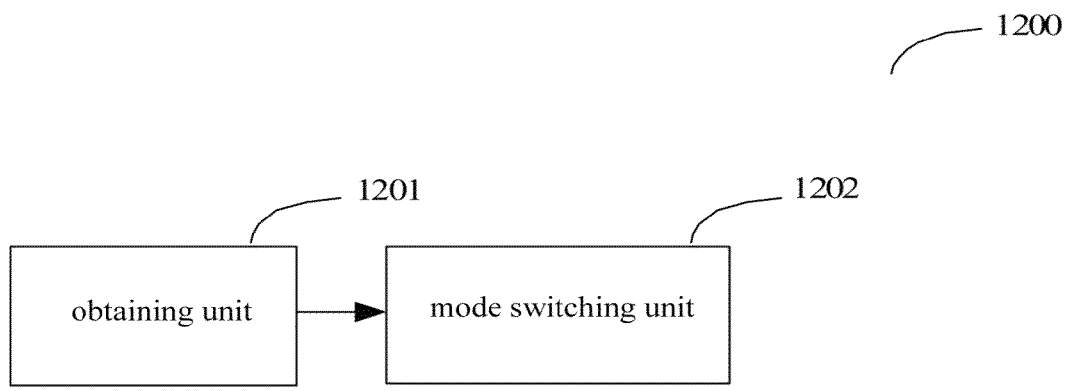
FIG. 12 is a block diagram of an electronic device according to another embodiment of the invention.
Figure 13:
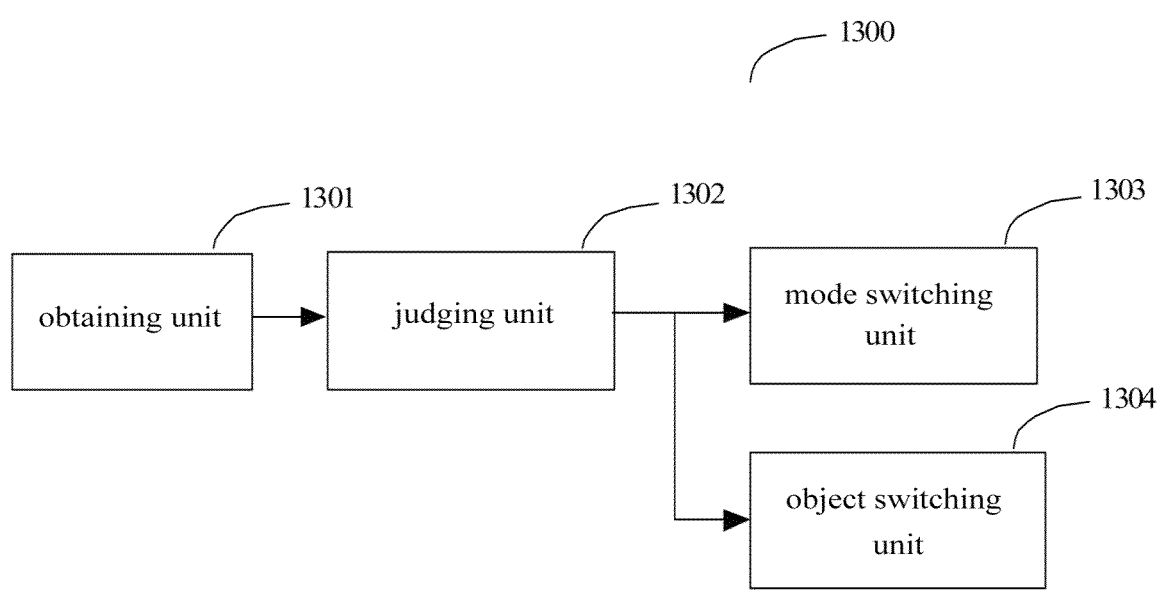
FIG. 13 is a block diagram of an electronic device according to another embodiment of the invention.

Next, with reference to FIG. 11 to FIG. 13, the electronic device according to the embodiment of the invention is described.

FIG. 11 is a block diagram of an electronic device 1100 according to another embodiment of the invention. K objects are stored in the storage medium of the electronic device 1100. The electronic device 1100 includes:

an obtaining unit 1101, for obtaining a switch instruction;

a mode switching unit 1102, for switching a first mode to a second mode, or from the second mode to the first mode, according to the switch instruction;

wherein, in the first mode, when the obtaining unit 1101 obtains a first input instruction, each of the currently displayed object $D_j$ is switched to $D_{j-1}$ or $D_{j+1}$ according to the input parameter information of the first input instruction;

in the second mode, when the obtaining unit 1101 obtains a second input instruction, each of the currently displayed object $D_j$ is switched to $D_{j-N}$ or $D_{j+N}$ according to the input parameter information of the second input instruction;

said K, j, N are integers, and K≥1, N≥1, 1≤j≤K.

In addition, by selecting one of the objects displayed on the touch screen, the object can appear in a first predetermined area on the touch screen.

In addition, the page of contact information of the object can be open by clicking the identification of the object within the first predetermined area.

The electronic device according to the embodiment of the invention can further include: a second obtaining unit (not illustrated), for obtaining an operation instruction; a starting unit (not illustrated), for starting an application according to the operation instruction; the application invokes a first information of the object within the first predetermined area.

The electronic device according to the embodiment of the invention can further include: a detecting unit (not illustrated), for detecting an operation gesture within a second predetermined area on the touch screen, wherein the identification of an application is displayed within the second predetermined area; the starting unit (not illustrated) includes: sub starting unit (not illustrated), for starting the application displayed within the second predetermined area according to the operation gesture.

Therefore, with the electronic device of the embodiment of the invention, in the case that the user wants to view objects one by one, it can be switched to the first mode; in the case that the number of objects is large and the user wants to view whole objects, it can be switched to the second mode, thereby the user can perform switch and display to multiple objects stored in the electronic device in different modes by a simple operation, as necessary, thereby improving user experience. Also, the user can set an object in the center of the screen by clicking the object, and the identification of application can appear around the object. Clicking identification of application can invoke an application which use the information on the object, thereby making user's operation more convenient.

FIG. 12 is a block diagram of an electronic device 1200 according to another embodiment of the invention. K objects are stored in the storage medium of the electronic device 1200. The electronic device 1200 includes:

an obtaining unit 1201, for obtaining a switch instruction; and a switching unit 1202, for switching from a first display mode to a second display mode, or from the second display mode to the first display mode according to the switch instruction;

wherein in the first display mode, m objects among the K objects are displayed;

in the second display mode, n objects among the K objects are displayed;

said K, m, n are integers, and $1 \leq m < n \leq K$.

In addition, by selecting one of the objects displayed on the touch screen, the object will appear in a first predetermined area on the touch screen.

In addition, the page of contact information of the object can be open by clicking identification of the object within the first predetermined area.

The electronic device according the embodiment of the invention can further include: a second obtaining unit (not illustrated), for obtaining an operation instruction; a starting unit (not illustrated), for starting an application according to the operation instruction; the application invokes a first information of the object within the first predetermined area.

The electronic device according to the embodiment of the invention can further include: a detecting unit (not illustrated), for detecting an operation gesture within a second predetermined area on the touch screen, wherein the identification of an application is displayed within the second predetermined area; the staring unit (not illustrated) includes: a sub starting unit (not illustrated), for starting the application displayed within the second predetermined area according to the operation gesture.

Therefore, with the electronic device of the embodiment of the invention, the user can view different numbers of objects in two display modes by a simple operation, thereby less objects are displayed or more objects are displayed according to the user's need, which makes user's operation convenient and improves user's experience. Also, the user can set object in the center of screen by clicking the object, and the identification of application can appear around the object. Clicking identification of the application can invoke application which uses information of the object, thereby making user's operation more convenient.

FIG. 13 is a block diagram of an electronic device 1300 according to another embodiment of the invention. K objects $[D_1, \ldots, D_K]$ are stored in the storage medium of the electronic device 1300, and the current mode of the electronic device 1300 is either one of first mode and second mode. The electronic device 1300 includes:

an obtaining unit 1301, for obtaining an instruction;

a judging unit 1302, for judging whether the instruction is a switch instruction or an input instruction;

a mode switching unit 1303, for switching the current mode to the other one of first mode and second mode in the case that the instruction is a switch instruction;

an object switching unit 1304, for performing switch to objects according to the current mode in the case that the instruction is an input instruction.

Specifically, in the case that the current mode is the first mode, according to the input parameter information of the input instruction (corresponding to the first input instruction described above with reference to FIG. 8), each of the currently displayed object $D_j$ is switched to $D_{j-1}$ or $D_{j+1}$; in the case that the current mode is the second mode, according to the input parameter information of the input instruction (corresponding to the second input instruction described above with reference to FIG. 8), each of currently displayed object $D_j$ is switched to $D_{j-N}$ or $D_{j+N}$. Wherein said K, j, N are integers, and $K \geq 1$, $N \geq 1$, $1 \leq j \leq K$.

With the electronic device of the embodiment of the invention, when the user inputs an instruction, the electronic device can judge the type of the instruction, and switch the current mode or correspondingly switch the displayed object in the current mode according to the result of judgment, thereby making user's operation convenient.

Figure 14A:
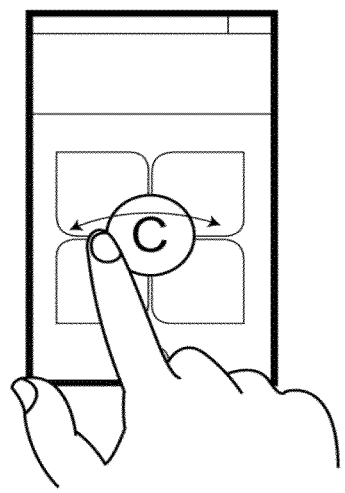
FIG. 14A and FIG. 14B are schematic display diagrams when performing object switching by utilizing the electronic device according to the embodiment of the invention.
Figure 14B:
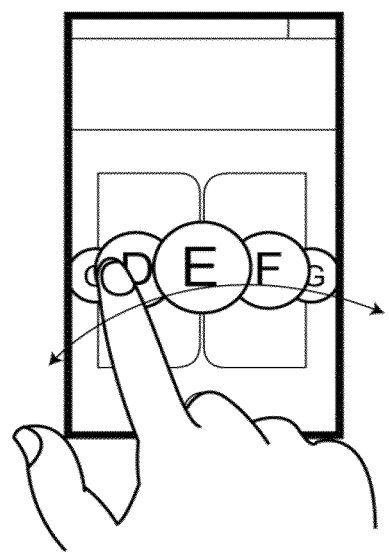

Next, the diagram of FIG. 14 and FIG. 15 are referred. FIG. 14A and FIG. 14B are display schematic diagrams when performing object switch utilizing the electronic device of the embodiment of the invention. Assuming objects A, B, C, D, E, F, G and H are sequentially stored in the electronic device. As illustrated in FIG. 14A, the currently displayed object is C. Assuming the switch instruction corresponding to sliding leftward on the touch screen with finger is to switch towards the direction of object D, and the switch instruction corresponding to sliding rightward is to switch towards the direction of object B.

In the case that the electronic device currently is in the first mode, if user slides leftward on the touch screen with finger, the currently displayed object C is switched to object D; if the user slides rightward on the touch screen with finger, currently displayed object C is switched to object B. In this case, for example, if the user presses the object C displayed on the touch screen for more than a predetermined period, the electronic device is switched to the second mode. In this case, if the user slides leftward on the touch screen with finger, the electronic device switches the currently displayed object C by N objects towards object D side, wherein the value of N is determined for example according to the sliding length by the user. For example, the longer the sliding length is, the greater N is. Still, for example, the value of N is determined according to the sliding speed by the user. The faster the speed is, the greater N is. Assuming N=3, the currently displayed object is switched to F. Assuming N=6, if objects A-H is not stored in circular, the electronic device will not switch the display of objects. That is, the object C is still displayed. If objects A-H are stored in circular manner, the electronic device switches the currently displayed object C to object A. When the electronic device is in the second mode, for example, if the user presses the rectangular area in the top of the touch screen, the electronic device will be switched to the first mode.

It is to be noted that, in the electronic device of the embodiment of the invention, regardless of the first mode or the second mode, the objects currently displayed by the electronic device are not limited to one object, but may be multiple objects. The case of currently displaying multiple objects is illustrated in FIG. 14B, wherein five objects C, D, E, F and G are displayed. The operation of FIG. 14B is similar to the operation of FIG. 14A, thus description thereof is omitted herein.

Figure 15A:
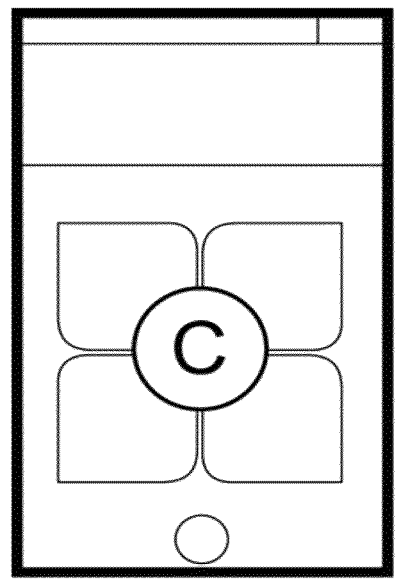
FIG. 15A and FIG. 15B are schematic display diagrams of the electronic device according to the embodiment of the invention.
Figure 15B:
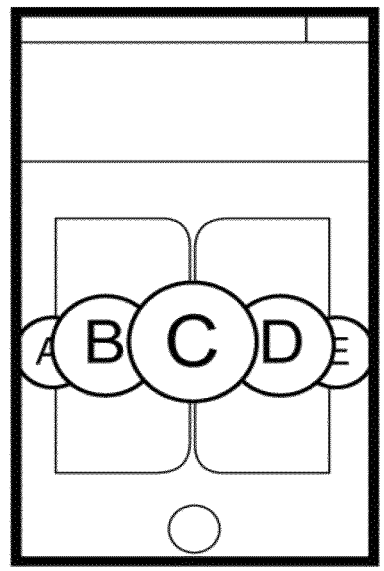

FIG. 15A and FIG. 15B are display schematic diagram of the electronic device of the embodiment of the invention. FIG. 15A illustrates the first display mode, wherein one object C among objects A-H is displayed. In this display mode, for example, if the user presses the area of display object C on the touch screen for more than a predetermined period, the electronic device is switched to the second display mode. FIG. 15B illustrates the second display mode, wherein five objects A, B, C, D and E among objects A-H are displayed, and the object C last displayed in the first display mode before switching is centered and enlarged displayed. In this display mode, for example, if the user presses the rectangular area in the top of the touch screen, the electronic device will be switched to the first display mode.

It is to be noted that, the electronic device in the embodiments of the invention may include a mobile terminal or a portable computer and the like.

At last, it is to be noted that, in the specification, relationship terms such as first, second and the like are only used to distinguish one entity or operation from another entity or operation, but not necessarily require or imply there's any actual relationship or sequence between these entities or operations. Also, terms "include", "comprise" or any other variation intend to express non-exclusive containing, thereby a procedure, a method, a product or a device including a series of elements can not only include those elements, but also include other elements which is not listed definitely, or includes elements which is inherent to this procedure, method, product or device. In the case that there's no more limitation, element defined by sentence "including one . . . " does not exclude the procedure, method, product or device including said element also has additional same element.

By the description of the above embodiments, those skilled in the art can clearly understand that the invention can be implemented by software and necessary hardware platform, and of course can be implemented only by hardware. Based on such understanding, the entire or a part of the technical solution of the invention which is contribute to the prior art may be embodied in the form of software product. This computer software product can be stored in a storage medium, such as a ROM/RAM, a disk, an optical disc and the like, include many instructions to cause one computer device (may be personal computer, server or network device etc.) to implement the embodiments of the invention or method describe by some parts of the embodiment.

The invention has been described in details hereinabove. In the specification, the principle and embodiments of the invention are explained using specific examples. The explanations of the above embodiments are only used to help understand the method of the invention and core concept thereof; meanwhile, for those skilled in the art, according to the concept of the invention, there are modifications in terms of specific implementation mode and application range. To sum up, the content of the specification cannot be construed to limit the invention.

The invention claimed is:

1. An object determining method applied to a touch sensitive portable device, identifications of multiple objects are displayed within a display area of said portable device, each of the identifications of said multiple objects has a first status of being selected and a second status of being unselected, wherein said display area has a first area, the identification of a first object is displayed in the first area, the first object is in the first status, the method comprising:
   obtaining a switch instruction;
   moving the identification of the first object out of the first area, switching the identification of the first object from the first status to the second status, moving the identification of a second object into the first area in sync with moving the identification of the first object out of the first area, and switching the identification of the second object from the second status to the first status, according to the switch instruction;
   obtaining an operation instruction;
   starting an application according to the operation instruction; and
   invoking a first information of the second object within the first area by the application;
   wherein the step of obtaining an operation instruction comprises detecting an operation gesture within a second area of the display area of the portable device, and wherein the identification of an application is displayed in the second area and the step of starting an application according to the operation instruction comprises starting the application displayed within the second area according to the operation gesture, without moving the identification of the application into the first area.

2. The method according to claim 1, wherein, said step of obtaining a switch instruction comprising:
   detecting a first slide gesture in the first area, and not responding to the original touch point of the first slide gesture;
   determining a first direction of the first slide gesture; and
   determining the switch instruction according to the first slide gesture and the first direction.

3. The method according to claim 1, wherein, a page of contact information of the second object is open by the click of the identification of the second object within the first area.

4. The method according to claim 1, wherein, the objects are contacts in a directory.

5. The method according to claim 1, wherein, the application comprises a call program, a short message program, a chat program or an e-mail program.

6. The method according to claim 1, further comprising switching the display of K objects [$D_1, \ldots, D_K$], wherein, said step of switching comprising:
   obtaining a second switch instruction; and
   switching from a first mode to a second mode, or from the second mode to the first mode according to the second switch instruction;
   wherein,
   in the first mode, when a first input instruction is obtained, according to input parameter information of the first input instruction, in the case that the first object is $D_j$, the second object is $D_{j-1}$, or $D_{j+1}$, in the second mode, when a second input instruction is obtained, according to input parameter information of the second input instruction, in the case that the first object is $D_j$, the second object is $D_{j-N}$ or $D_{j+N}$, said K, j, N are integers, and K≥1, N≥1, 1≤j≤K.

7. The method according to claim 1, further comprising displaying K objects, said step of displaying the K objects comprising:
   obtaining a second switch instruction; and
   switching from a first display mode to a second display mode, or from the second display mode to the first display mode according to the second switch instruction;
   wherein, in the first display mode, m objects among the K objects are displayed;
   in the second display mode, n objects among the K objects are displayed;
   said K, m, n are integers, and 1≤m<n≤K.

8. A portable device with a touch sensitive function, with identifications of multiple objects displayed within a display area of the portable device, each of the identifications of the multiple objects has a first status of being selected and a second status of being unselected, wherein, the display area has a first area, the identification of a first object is displayed in the first area, the first object is in the first status, the portable device comprising:
   a first obtaining unit for obtaining a switch instruction; and
   a switching unit for moving the identification of the first object out of the first area, switching the identification of the first object from the first status to the second status, moving the identification of a second object into the first area in sync with moving the identification of the first object out of the first area, and switching the identification of the second object from the second status to the first status, according to the switch instruction;
   a second obtaining unit, for obtaining an operation instruction;
   a starting unit, for starting an application according to the operation instruction, wherein, the application invokes a first information of the second object within the first area,
   wherein, the second obtaining unit comprises a second detecting unit to detect an operation gesture within a second area of the display area of the portable device, wherein the identification of an application is displayed in the second area and the starting unit comprises a sub starting unit to start the application displayed within the second area according to the operation gesture, without moving the identification of the application into the first area.

9. The portable device according to claim 8, wherein, said first obtaining unit comprising:
   a first detecting unit, for detecting a first slide gesture in the first area, and not responding to the original touch point of the first slide gesture;
   a first determining unit, for determining a first direction of the first slide gesture; and
   a second determining unit, for determining the switch instruction according to the first slide gesture and the first direction.

10. The portable device according to claim 8, wherein, a page of contact information of the second object is open by the click of the identification of the second object within the first area.

11. The portable device according to claim 8, wherein, the portable device comprises a mobile terminal or a notebook computer.

12. The portable device according to claim 8, wherein, the application comprises a call program, a short message program, a chat program, or an e-mail program.

13. The portable device according to claim 8, further comprising a switch unit for switching the displays of K objects $[D_1, \ldots, D_K]$, wherein said switch unit comprising:
   a third obtaining unit, for obtaining a second switch instruction; and
   a mode switching unit, for switching from a first mode to a second mode, or from the second mode to the first mode according to the second switch instruction; wherein,
   in the first mode, when a first input instruction is obtained, according to input parameter information of the first input instruction, in the case that the first object is D, the second object is $D_{j-1}$ or $D_{j+N}$,
   in the second mode, when a second input instruction is obtained, according to input parameter information of the second input instruction, in the case that the first object is $D_j$, the second object is $D_{j-N}$ or $D_{j+N}$,
   said K, j, N are integers, and K≥1, N≥1, 1≤j≤K.

14. The portable device according to claim 8, further comprising a display processing unit for displaying K objects, said display processing unit comprising:
   a third obtaining unit, for obtaining a second switch instruction; and
   a mode switching unit, for switching from a first display mode to a second display mode, or from the second display mode to the first display mode, according to the second switch instruction;
   wherein,
   in the first display mode, m objects among the K objects are displayed;
   in the second display mode, n objects among the K objects are displayed; said K, m, n are integers, and 1≤m<n≤K.

15. An object determining method applied to a touch sensitive portable device having identifications of multiple objects displayed within a display area of the portable device, each of the identifications of the multiple objects has a first status of being selected and a second status of being unselected, wherein the display area has a first area, the identification of a first object is displayed in the first area, and the first object is in the first status, the method comprising:
   obtaining a switch instruction;
   moving the identification of the first object out of the first area,
   switching the identification of the first object from the first status to the second status,
   moving the identification of a second object into the first area in sync with moving the identification of the first object out of the first area, and
   switching the identification of the second object from the second status to the first status, according to the switch instruction;
   obtaining an operation instruction;
   starting an application according to the operation instruction;
   invoking a first information of the second object within the first area by the application;
   wherein the step of obtaining an operation instruction comprises detecting a second slide gesture and not responding to the original touch point of the second slide gesture, and wherein the original touch point is located within the first area, the display area of the portable device also has a second area, and the identification of an application is displayed in the second area;

determining a second direction of the second slide gesture, wherein the second direction points to the second area; and determining the operation instruction according to the second slide gesture and the second direction.

16. A portable device with a touch sensitive function having identifications of multiple objects displayed within a display area of the portable device, each of the identifications of the multiple objects has a first status of being selected and a second status of being unselected, wherein, the display area has a first area, the identification of a first object is displayed in the first area, and the first object is in the first status, the portable device comprising:

a first obtaining unit for obtaining a switch instruction;

a switching unit for moving the identification of the first object out of the first area, switching the identification of the first object from the first status to the second status, moving the identification of a second object into the first area In sync with moving the identification of the first object out of the first area, and switching the identification of the second object from the second status to the first status, according to the switch instruction;

a second obtaining unit for obtaining an operation instruction;

a starting unit for starting an application according to the operation instruction, wherein the application invokes a first information of the second object within the first area;

the second obtaining unit comprising:

a third detecting unit for detecting a second slide gesture and not responding to the original touch point of the second slide gesture, wherein the original touch point is located within the first area, the display area of the portable device has a second area, and identification of an application is displayed in the second area;

a third determining unit for determining a second direction of the second slide gesture wherein the second direction points to the second area; and a fourth determining unit for determining the operation instruction according to the second slide gesture and the second direction.

* * * * *